United States Patent
Tkachenko et al.

(10) Patent No.: US 11,641,122 B2
(45) Date of Patent: May 2, 2023

(54) BATTERY CHARGING THROUGH MULTI-STAGE VOLTAGE CONVERSION

(71) Applicant: GBatteries Energy Canada Inc., Ottawa (CA)

(72) Inventors: Oleksandr Tkachenko, Ottawa (CA); Mykola Sherstyuk, Ottawa (CA); Aleksandar Prodic, Toronto (CA); Timothy McRae, Toronto (CA); Ivan Radovic, Etobicoke (CA); Oleksandr Puzakov, Carp (CA)

(73) Assignee: Gbatteries Energy Canada Inc., Ottawa (CA)

( * ) Notice: Subject to any disclaimer, the term of this patent is extended or adjusted under 35 U.S.C. 154(b) by 95 days.

(21) Appl. No.: 16/710,635

(22) PCT Filed: Jun. 7, 2018

(86) PCT No.: PCT/CA2018/050683
§ 371 (c)(1),
(2) Date: Dec. 11, 2019

(87) PCT Pub. No.: WO2018/227278
PCT Pub. Date: Dec. 20, 2018

(65) Prior Publication Data
US 2020/0185947 A1    Jun. 11, 2020

Related U.S. Application Data

(60) Provisional application No. 62/518,120, filed on Jun. 12, 2017.

(51) Int. Cl.
*H02J 7/00*    (2006.01)
*H02J 7/06*    (2006.01)

(52) U.S. Cl.
CPC ........ *H02J 7/0071* (2020.01); *H02J 7/0019* (2013.01); *H02J 7/00711* (2020.01); *H02J 7/06* (2013.01); *H02J 2207/20* (2020.01)

(58) Field of Classification Search
CPC .... H02J 2207/20; H02J 7/0019; H02J 7/0071; H02J 7/00711; H02J 7/04; H02J 7/06
(Continued)

(56) References Cited

U.S. PATENT DOCUMENTS 5,196,995 A * 3/1993 Gulczynski ............. H02M 7/48
                                                        323/224
5,742,189 A * 4/1998 Yoshida ................. H03D 7/161
                                                        327/113

(Continued)

FOREIGN PATENT DOCUMENTS

CN    103236731 A    8/2013
WO    2012151466 A2  11/2012

OTHER PUBLICATIONS

International Search Report issued in International Application No. PCT/CA2018/050683, dated Sep. 5, 2018, 4 pages.

(Continued)

*Primary Examiner* — Nathaniel R Pelton

(57) ABSTRACT

A pulse charging for a battery includes multi-stage voltage conversion. At first stage, an input voltage from a power supply is divided into a plurality of intermediate voltages. At second stage, one or more of the plurality of intermediate voltage are further down converted to generate one or more portions of a charging pulse to be applied to the battery. The down conversion of the input voltage to the output voltage is accompanied by increase in charging current that is applied to the battery. The higher charging current applied to the battery results in fast charging of the battery. Also, the described multi-stage voltage conversion circuitry has high (Continued)

efficiency which alleviates problem of heat dissipation associated with the voltage conversion for charging of the battery.

17 Claims, 18 Drawing Sheets

(58) Field of Classification Search
USPC .......................................................... 320/140
See application file for complete search history.

(56) References Cited

U.S. PATENT DOCUMENTS

| | | | | |
|---|---|---|---|---|
| 5,773,955 | A * | 6/1998 | Hall | H02J 7/022 320/104 |
| 6,834,001 | B2 * | 12/2004 | Myono | H02M 3/07 363/60 |
| 7,456,521 | B2 | 11/2008 | Weidenheimer et al. | |
| 7,746,041 | B2 | 6/2010 | Xu et al. | |
| 7,915,874 | B1 | 3/2011 | Cuk | |
| 8,354,825 | B2 | 1/2013 | Lee et al. | |
| 8,772,967 | B1 * | 7/2014 | Ikriannikov | H02M 1/14 307/82 |
| 8,779,722 | B2 | 7/2014 | Lee et al. | |
| 9,637,012 | B2 | 5/2017 | Biagini et al. | |
| 9,641,079 | B2 | 5/2017 | Schmalnauer et al. | |
| 9,728,996 | B2 * | 8/2017 | Jang | H02J 7/02 |
| 10,574,079 | B1 * | 2/2020 | Berkowitz | H02J 50/10 |
| 2003/0137853 | A1 * | 7/2003 | Zaitsu | H02M 3/33592 363/25 |
| 2007/0019442 | A1 * | 1/2007 | Li | H02M 3/1588 363/15 |
| 2007/0096696 | A1 * | 5/2007 | Lefley | H01M 10/4257 320/141 |
| 2007/0096955 | A1 * | 5/2007 | New | H02M 3/33561 341/50 |
| 2007/0235293 | A1 * | 10/2007 | Steimer | H02M 7/483 200/2 |
| 2008/0238359 | A1 * | 10/2008 | Bourilkov | H02J 7/007182 320/107 |
| 2009/0033293 | A1 | 2/2009 | Xing et al. | |
| 2009/0135628 | A1 | 5/2009 | Ye et al. | |
| 2009/0225569 | A1 * | 9/2009 | Begalke | H02M 3/3378 363/17 |
| 2009/0323378 | A1 * | 12/2009 | Melse | H02M 3/07 363/60 |
| 2010/0217466 | A1 * | 8/2010 | Ichikawa | B60L 58/15 701/22 |
| 2011/0089898 | A1 | 4/2011 | Lee et al. | |
| 2013/0094157 | A1 | 4/2013 | Guiliano et al. | |
| 2013/0249295 | A1 * | 9/2013 | Hsieh | H02J 7/35 307/43 |
| 2014/0254208 | A1 * | 9/2014 | Dai | H02M 3/33569 363/21.02 |
| 2015/0048743 | A1 * | 2/2015 | Liao | G09G 3/3648 315/161 |
| 2015/0155789 | A1 * | 6/2015 | Freeman | H02M 1/08 363/16 |
| 2015/0155895 | A1 * | 6/2015 | Perreault | H02M 3/07 455/127.3 |
| 2015/0162841 | A1 * | 6/2015 | Masuda | H02M 3/3376 363/17 |
| 2016/0033988 | A1 | 2/2016 | Voorwinden | |
| 2016/0344214 | A1 | 11/2016 | Petersen et al. | |
| 2017/0149263 | A1 * | 5/2017 | Zhang | H02J 7/0045 |
| 2017/0179715 | A1 * | 6/2017 | Huang | H02J 50/001 |
| 2018/0041060 | A1 | 2/2018 | Walley et al. | |
| 2018/0090977 | A1 * | 3/2018 | Zhang | H02M 7/217 |
| 2018/0097391 | A1 * | 4/2018 | Baby | H02J 7/0068 |

OTHER PUBLICATIONS

Jiang, Zhenhua et al., "Synergetic Control of Power Converters for Pulse Current Charging of Advanced Batteries From a Fuel Cell Power Source", IEEE Transactions on Power Electronics, vol. 19, No. 4, Jul. 2004, 11 pages.

Abeyratne, Sunil G. et al., "Zero-current-switching pulse charger for high capacity batteries in renewable energy applications", J. Natn. Sci. Foundation Sri Lanka, 2016, 44 (3): 301-312.

Radic, Aleksandar, et al., "High-Powere Density Hybrid Converter Topologies for Low-Power Dc-Dc SMPS", The 2014 International Power Electronics Conference, IEEE, 2014, 3582-3586.

Lai, Ching-Ming et al., "A High-Gain Reflex-Based Bidirectional DC Charger with Efficient Energy Recycling for Low-Voltage Battery Charging-Discharging Power Control", Energies, 2018, 11, 623, 14 pages.

Wan, Hongmei, "High Efficiency DC-DC Converter for EV Battery Charger Using Hybrid Resonant and PWM Technique" Thesis submitted to the faculty of the Virginia Polytechnic Institute and State University, Apr. 30, 2012, 125 pages.

First Examination Report for related Indian patent application No. 201917052597 dated Sep. 23, 2021.

Search Report and Opinion for related EP patent application No. 18817985.7 dated Oct. 15, 2020.

* cited by examiner

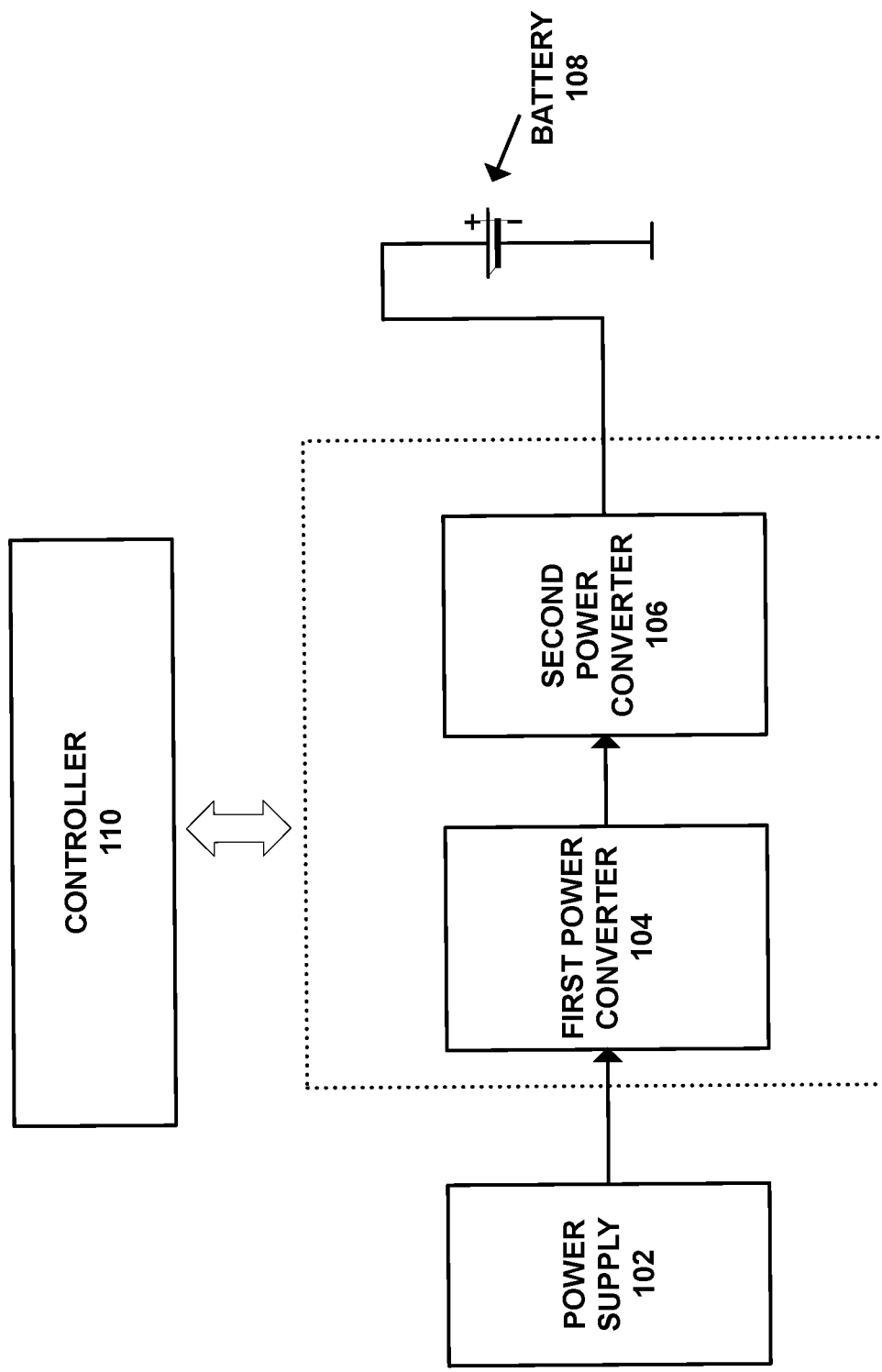

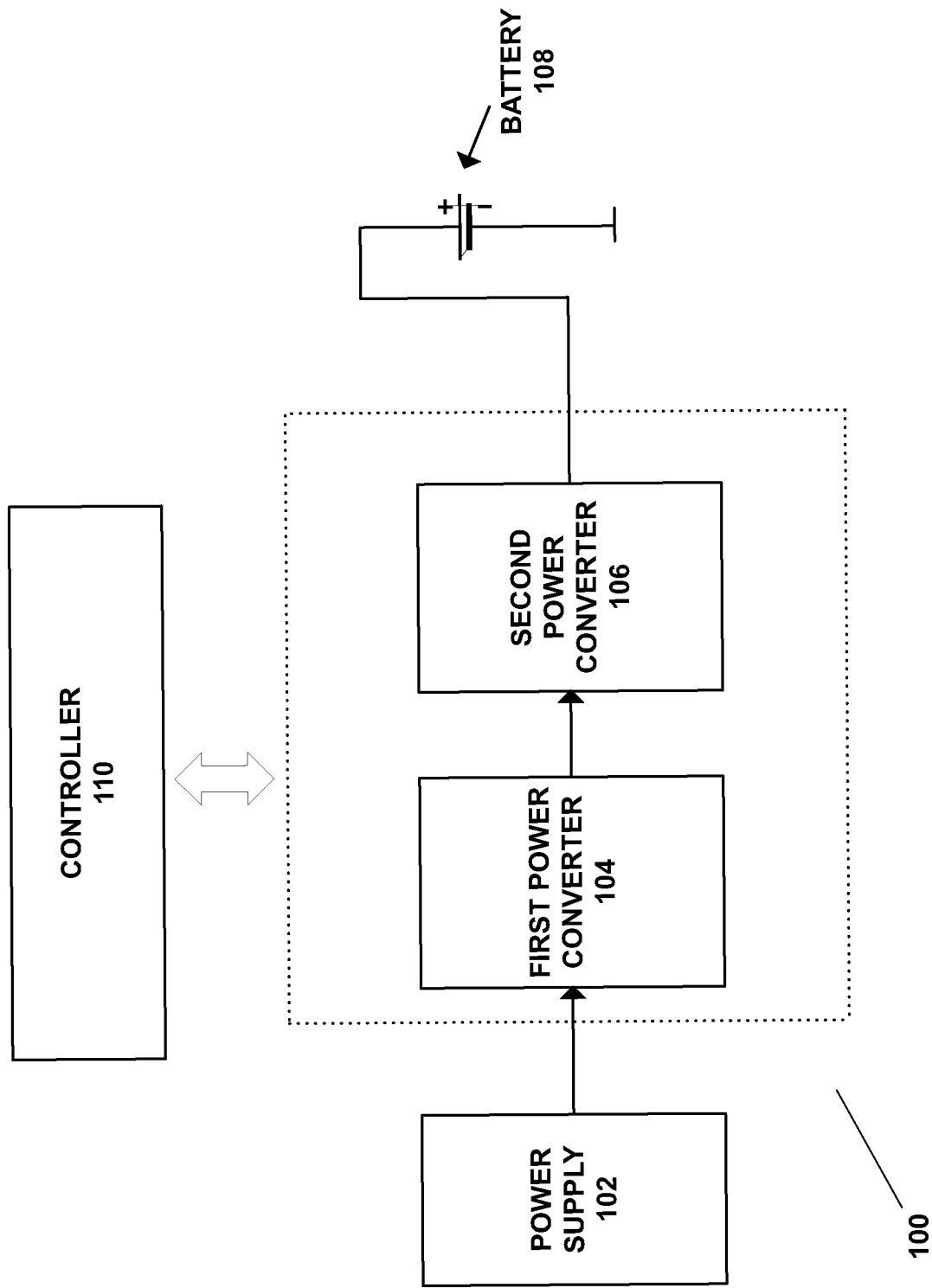

BATTERY CHARGING THROUGH MULTI-STAGE VOLTAGE CONVERSION

CROSS REFERENCE TO RELATED APPLICATION

This application is a national phase application from PCT/CA2018/050683 filed Jun. 7, 2018, which claims priority to U.S. Provisional Patent Application No. 62/518,120, filed on Jun. 12, 2017, the content of all of which is incorporated herein by reference in its entirety for all purposes.

BACKGROUND

Rechargeable batteries are electrochemical energy storage systems that are used in numerous applications around the world. However, the problem that limits use of rechargeable batteries is speed of charging the batteries. The speed of charging the batteries is directly proportional to amplitude of current pumped into the batteries. As such, to increase the speed of charging, higher current needs to be provided to the battery.

However, conventionally used energy sources used to charge the batteries for mobile devices are capable of providing current with limited amplitude. Hence, there is a need to employ a power converter to perform voltage conversion on power input from an energy source that provides power to charge the batteries of such mobile devices. The power converter converts high voltage low current input obtained from the energy source to low voltage high current output for the battery. The conventionally employed power converters for such conversion have low efficiency, and dissipate heat higher than the designated limit. For example, a commonly used USB-C power supply has an output rating of 20 volts (V) 5 ampere (A) that is convertible to 4.2V 3A to charge a mobile device at a nominal rate with heat dissipation in limited range. However, to charge the battery faster (for example six times faster), 18A current at 4.2V needs to be pumped into the battery. Therefore, when the USB-C output is to be converted by the conventional power converter to 4.2V 18A, about 3 watt (W) of heat may be dissipated, which is undesirable.

Hence, there is a need of an improved battery charging system for fast charging of the battery.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 1 shows a block diagram of a battery charging system in accordance with the present disclosure.

SUMMARY OF THE DISCLOSURE

Figure 2A:
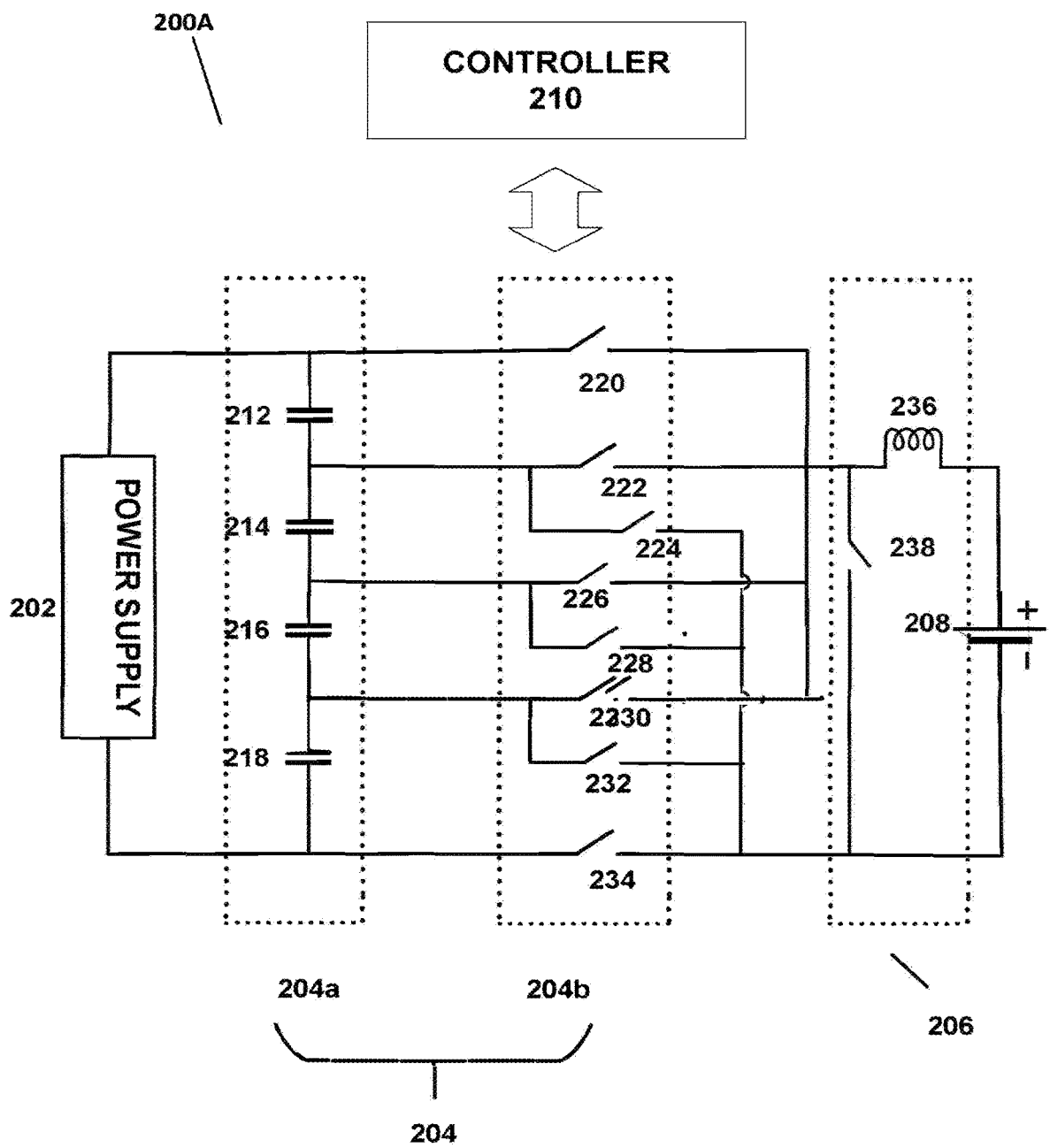
FIG. 2A illustrates an example of a battery charging system in accordance with the present disclosure.

The present disclosure presents circuits and techniques for charging of a battery, which include multi-stage voltage conversion. The charging of the battery in accordance with the present disclosure involves providing a charging pulse through multi-stage multi-cycle voltage conversion. In each voltage conversion cycle, the input voltage received from a power supply is down-converted to generate a plurality of intermediate voltages. The one or more of the plurality of intermediate voltages are further down converted to generate one or more portions of a charging pulse. Hence, each charging pulse is made up of the plurality of portions that are generated by a plurality of multi-stage voltage conversion cycles. In the voltage conversion cycles, the increase in average current to the battery makes up for the reduction in input voltage, and ideally preserves the power provided to the battery. As such, the voltage conversion cycles includes converting low current high voltage power input from the energy source to high current low voltage output provided to the battery. Hence, the battery charging technique in accordance with the present disclosure enables fast charging of the battery by facilitating pumping of high current into the battery with minimized heat dissipation.

In accordance with an aspect of the present disclosure, a system to charge a battery comprises a first power converter, a second power converter, and a controller that is configured to control execution of a plurality of voltage conversion cycles to provide a charging pulse to the battery. Each voltage conversion cycle includes operations to obtain an input voltage by the first power converter from the power supply, generate a plurality of intermediate voltages based on the input voltage by the first power converter, provide one or more of the plurality of intermediate voltages to the second power converter, and generate by the second power converter one or more portions of a charging pulse, based on the one or more of the plurality of intermediate voltages. The controller may be configured to provide a plurality of portions of the charging pulse generated during the plurality of voltage conversion cycles to the battery.

In accordance with another aspect of the present disclosure, a method to charge a battery comprising controlling, by a controller, execution of the plurality of voltage conversion cycles to provide a charging pulse to the battery. In each voltage conversion cycle, a first power converter obtains an input voltage from a power supply, generates a plurality of intermediate voltages based on the input voltage, and provides one or more of the plurality of intermediate voltages to a second power converter. Further, in each voltage conversion cycle, the second power converter generates one or more portions of the charging pulse based on the one or more of the plurality of intermediate voltages. The method further comprises providing, by the controller, the plurality of portions of the charging pulse generated during the plurality of voltage conversion cycles to the battery.

In accordance with another aspect of the present disclosure, a chipset comprises a capacitive voltage divider, an inductive converter, and a controller. The capacitive voltage divider includes a plurality of capacitive elements and a plurality of first switching elements. The inductive converter includes at least one inductive element and at least one second switching element. The controller is configured to control execution of a plurality of voltage conversion cycles to provide a charging pulse to a battery. Each voltage conversion cycle includes operations to obtain an input voltage by the capacitive voltage divider from the power supply, generate a plurality of intermediate voltages based on the input voltage by the capacitive voltage divider, provide one or more of the plurality of intermediate voltages to the inductive converter, and generate one or more portions of the charging pulse, based on the one or more of the plurality of intermediate voltages, by the inductive converter. The controller is configured to provide a plurality of portions of the charging pulse generated during the plurality of voltage conversion cycles to the battery.

DETAILED DESCRIPTION OF THE DISCLOSURE

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprise," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art to which this disclosure belongs.

FIG. 1 shows a system 100 to charge a battery 108 as described herein. The battery 108 is rechargeable, which can be charged and discharged as many times during its life. The battery 108 can be a single cell battery or a multi-cell battery, e.g., a battery pack. The battery 108 can be, but not limited to, a lithium-ion battery, a lithium metal battery, a sodium ion battery, a nickel cadmium battery, a nickel metal hydride battery, or a lead acid battery. It is to be understood that the methods and systems of battery charging described herein are not limited by the battery type.

The system 100 comprises a first power converter 104 and a second power converter 106, which perform voltage conversion on an input voltage obtained from a power supply 102 to provide charging pulses to the battery 108 in accordance with the present disclosure. The system 100 further comprises a controller 110 that is operatively coupled to the first power converter 104, the second power converter 106, and the battery 108 to control operations to charge the battery 108. The controller 110 includes control logic (not shown in drawings) to control charging of the battery 108 in accordance with the present disclosure. In some embodiments, the controller 110 can be a microcontroller and includes a central processing unit to process instructions and data, on-board memory to store instructions and data, a digital to analog converter for voltage measurement, and drive circuitry for the control of the first power converter 104 and the second power converter 106. In some embodiments, the controller 110 may include monitoring circuitry to monitor various parameters of the battery 108, for example, battery voltage, battery temperature, internal battery pressure, mechanical stress, and state of charge. The monitoring circuitry may include temperature sensor(s), pressure sensor(s), safety circuit(s), voltmeter(s), ammeter(s) and/or other sensor(s) as needed. The controller 110 may adapt charging process of the battery 108 based on the monitored parameters of the battery 108. The controller 110 can obtain charging current from power supply 102 to charge the battery 108.

The controller 110 may interoperate with a battery management system (BMS) of the battery 108 to control charging of the battery. The BMS (not shown in the drawings) is essentially the "brain" of a battery and controls charging of the battery. In particular, the BMS may control providing charging current to the battery to charge the battery. Further, the BMS may enable charging the battery 108 through any of the charging modes, including but not limited to, constant current (CC) constant voltage (CV) charging, and pulse charging. While pulse charging the battery, the BMS may control application of charging pulses to the battery 108. The applied charging pulses may be similar or different from each other. The BMS may also measure various parameters related to the battery 108, and use the measured parameters to manage operation of the battery 108. The various measurements done by BMS may include, but not limited to, voltage, current, state of charge (SoC), temperature, and state of health. Additionally, the BMS may calculate various values, which include but not limited to charge current limit (CCL), discharge current limit (DCL), energy delivered since last charge or discharge cycle, internal impedance, and charge delivered or stored (Coulomb counter). The BMS is also responsible for safe operation of the battery 108. The BMS may include a communication interface to communicate with the hardware within the battery 108, and with load such as, but not limited to, a mobile phone, electric vehicle, laptop, or any other electronic device to which the battery 108 supplies power. The BMS may further control charging of the battery 108 by continuously monitoring various parameters of the battery 108, including, but not limited to, state of charge, health, temperature, internal impedance etc., and varying charging parameters based on the monitored battery parameters. The various charging parameters that are adaptable by the BMS include ON duration, OFF duration, duty cycle, voltage level, and current level of the charging pulses. For example, the BMS may perform modulated pulse charging as described in commonly owned U.S. Patent Publication 20180013306, published on Jan. 11, 2018, the contents of which are incorporated herein in entirety as if fully set forth herein.

The controller 110 may include a communication interface to communicate with the BMS of the battery 108, and control charging of the battery 108.

In some embodiments, the controller 110 may operate as the BMS of the battery 108, and perform all such functions as performed by the BMS. The controller 110 can be an active BMS that adapts charging and discharging of the battery 108 in real-time by monitoring real-time electrochemical and macrokinetic processes that occur within the battery, or battery cells comprised within the battery. The controller 110 may perform active BMS functions as described in commonly owned U.S. patent application Ser. No. 15/939,018, the contents of which are incorporated herein in entirety as if fully set forth herein, for reference.

The power supply 102 depicted in FIG. 1 can be a charging source, which may be, for example, a dedicated adaptor, such as AC-to-DC wall adapter. In most cases, such adaptors are designed with the specific battery charging needs in mind, and thus the source capabilities of the charging source allow for proper capacity-based charging current of batteries, such as battery 108. In some embodiments, the power supply 102 can be charging source, which may be, for example, a non-dedicated adaptor, such as a universal charger not necessarily designed with any specific battery capacity in mind. As another example, the power supply 102 may be a communication or computer bus voltage signal, intended to provide power to a number of devices connected in parallel or serially to the bus. One non-limiting example of this type of voltage source is a Universal Serial Bus (USB) connection, which provides a voltage bus (VBUS) signal from which a constrained amount of current may be drawn. Another example of the power supply 102 can be a USB-C connector, which is a 24-pin USB connector system, which is distinguished by its two-fold rotational-symmetrical connector. The amount of current drawn from the USB-C connector is constrained as is the case with other connectors of similar kind. The constrained amount of current that can be withdrawn from the power supply 102 limits the speed of charging the battery 108, which necessitates the need of voltage conversion for fast charging of the battery 108.

In some embodiments, the controller 110 may be implemented as a component of the power supply 102. In such cases, the controller 110 may interoperate with the BMS of the battery 108 to control charging process.

In accordance with the present disclosure, the first power converter 104 and the second power converter 106 can be controlled by the controller 110 to perform voltage conversion for charging the battery 108. As such, the controller 110 controls execution of a plurality of voltage conversion cycles to provide a charging pulse to the battery. Each voltage conversion cycle includes a plurality of operations. The voltage conversion cycle begins with the first power converter 104 obtaining an input voltage from the power supply 102. The first power converter 104 generates the plurality of intermediate voltages based on the input voltage, and provide one or more of the plurality of intermediate voltages to the second power converter 106. The first power converter 104 may provide one or more of the plurality of intermediate voltages either individually or cumulatively to the second power converter 106. The second power converter 106 generates one or more portions or a charging pulse, based on the one or more of the plurality of intermediate voltages. The charging pulse generated in accordance with the present disclosure includes a plurality of portions which are generated in multiple voltage conversion cycles. The number of voltage conversion cycles required for providing each charging pulse depends on elements used in the voltage conversion circuitry, and pulse characteristics of the charging pulse. The charging pulses generated in accordance with the present disclosure can be different from each other, and the controller 110 may module such charging pulses based on real-time measurements of parameters of the battery 108. The controller 110 may generate modulated charging pulses in accordance with commonly owned U.S. patent application Ser. No. 15/644,498, the contents of which are incorporated herein in entirety for the reference.

In some embodiments, the controller 110 can use measurements of the battery 108 taken during the time of charging of the battery 108 to modulate ON time and OFF time (i.e. duty cycle) of charging pulses for the battery 108 through the first and second power converter accordingly. Topology examples of the system 100 to charge the battery 108 are illustrated in FIGS. 2A-2B and 5-7.

FIG. 2A illustrates an example of a system 200 to charge the battery in accordance with the present disclosure. In particular, FIG. 2A describes exemplary implementation of the multi-stage voltage conversion for pulse charging of a battery. The system 200A includes a controller 210 which is analogous to the controller 110 described above with respect to FIG. 1. The system 200 includes a capacitive voltage divider 204 as the first power converter. The capacitive voltage divider 204 is made-up of a series 204a of capacitive elements and a switching matrix 204b. The series 204a includes a plurality of capacitive elements 212, 214, 216, 218 connected in series with each other, thus providing functionality of voltage division. The switching matrix 204b includes a plurality of switching elements 220, 222, 224, 226, 228, 230, 232, and 234. The switching elements 220-234 can be semiconductor switches. Each of the switching elements 220-234 can be controlled to be turned ON or OFF (i.e., CLOSED or OPEN state) to regulate the flow of current in the associated circuitry.

Each of the plurality of switching elements 220-234 corresponds to one of the plurality of capacitive elements 212-218. For example, the capacitive element 212 is associated with the switching elements 220 and 224. The capacitive element 214 is associated with the switching elements 222 and 228. The capacitive element 216 is associated with the switching elements 226 and 232. The capacitive element 218 is associated with the switching element 230 and 234. The associated switching elements control discharging of the corresponding capacitive elements. For example, the turning ON (CLOSED state) of the switching elements 220 and 224 enable discharge of the capacitive element 212. Similarly, the switching elements 222 and 228 when turned ON (CLOSED state) by the controller 210, the discharging of the capacitive element 214 is enabled; the switching elements 226 and 232 when turned ON discharged the capacitive element 216; and when the switching elements 230 and 234 turned ON, the capacitive element 218 is discharged.

The system 200A depicted in FIG. 2 includes an inductive converter 206 as the second power converter. The inductive converter 206 is operatively coupled to the capacitive voltage divider 204. The inductive converter 206 includes an inductive element 236 and a switching element 238. The switching elements 238 can be semiconductor switches. The inductive converter 206 is controlled by the controller 210 to step-down the voltage obtained from the capacitive voltage divider 204.

In operation, the controller 210 controls the capacitive voltage divider 204 to obtain an input voltage from the power supply 202. The input voltage obtained by the capacitive voltage divider is divided, by virtue of the plurality of capacitive elements 212-218 connected in series with each other, to generate a plurality of intermediate voltages, each intermediate voltage across each of the capacitive elements 212-218. The value of the intermediate voltage across any capacitive element depends upon a capacitance value of the corresponding capacitive element. Since, all the capacitive elements 212-218 are connected in series, the charge Q on each of them is same, however the voltage V across each capacitive element 212-218 will be different and will depends on the capacitance value C of the capacitive element (V=Q/C). For example, if the input voltage obtained from the power supply is 20V, and the capacitance value of each of the four capacitive elements 212-218 is same, then the voltage across each of the four capacitive elements 212-218 will be substantially same i.e., 5V (20V/4). However, due to variation in parameters of the capacitive elements 212-218, the voltage across each of the four capacitive elements might be slightly mismatched even if the capacitive elements 212-218 are nominally chosen to be identical although the sum of the intermediate voltages across each the four capacitive elements 212-218 will be equal to the input voltage.

Initially, in the beginning, when the input voltage is to be obtained by the capacitive voltage divider 204, all of the switching elements 220-234 are kept in OPEN state by the controller 210, thus enabling the capacitive elements 212-218 to be charged and thus converting the input voltage to the plurality of intermediate voltages. The intermediate voltage across each of the plurality of capacitive elements 212-218 can be provided, either sequentially, or cumulatively, to the inductive converter 206 by turning ON the corresponding switching elements allowing the capacitive element(s) to discharge, thus providing the intermediate voltage(s) the inductive converter 206. For example, in order to discharge the capacitive element 212, the associated switching elements 220 and 224 are turned ON and all remaining switching elements in the switching matrix 204b are kept turned OFF, thus providing the intermediate voltage across the capacitive element 212 to the inductive converter 206. If the intermediate voltages across multiple capacitive elements are to be provided cumulatively to the inductive converter 206, then multiple associated switching elements are turned ON. For example, if the combined intermediate voltages across the capacitive elements 212 and 214 are to be provided to the inductive converter 206, then the switching elements 220 and 228 are turned ON, and the rest of the switching element in the switching matrix 204b are kept OFF.

The voltage to be applied to the inductive converter 206 is based on voltage required for portion(s) of the charging pulses that are generated in that voltage conversion cycle. For example, the rising edge of the charging pulse may require higher voltage to oppose impedance of the battery, therefore the intermediate voltage(s) provided to the inductive converter 206 to build rising edge of the charging pulse will be higher than other portions of the charging pulse.

The intermediate voltage obtained by the inductive converter 206 is down converted to an output voltage for the battery 208. The intermediate voltage applied across the inductive converter 206 results in current passing through the inductive element 236 and the battery 208. The current to the battery 208 through the inductive element 236 corresponds to one or more portions of the charging pulse generated based on the intermediate voltages provided to the inductive converter 206 through discharge of the one or more capacitive elements 212-218 in each voltage conversion cycle.

In each voltage conversion cycle, the inductive converter 206 switches between two operating states. In the first state, when the intermediate voltage(s) is provided by the capacitive voltage divider 204, the switching element 238 is kept OFF. In this state, the switching elements 220-234 are turned ON and OFF based on intermediate voltage across which capacitive element is to be provided to the inductive converter 206. The current as a result of application of intermediate voltage across the inductive converter 206 flows through the inductive element 236 to the battery 208. The current corresponds to one or more portions of a charging pulse. When the inductive element 236 charges to a desired level or when the inductive element is charged for a specific time period, the operation of the inductive converter 206 switches to a second state. In the second state, the switching elements 220-234 are turned OFF, and the switching element 238 is turned ON resulting in discharging of the inductive element 236 into the battery 208 thus providing charging pulses or charging current for the battery 208. When the inductive element 236 discharges to a specific level or when the inductive element 236 is discharged for a specific time period, the operation of the inductive converter again switches to the first state. The specific charging and discharging level of the inductive element 236, or the specific time periods of charging and discharging of the inductive element 236 are based on desired pulse characteristics of the charging pulse. The switching frequency of the switching elements 238 and 220-234 can also be controlled by the controller 210 to vary the pulse characteristics of the charging pulse. The pulse characteristics may include, but not limited to, pulse duration, pulse amplitude, pause duration between pulses, pulse width etc. For example, a charging pulse having multiple portions which may correspond to different voltage levels can be generated in accordance with the present disclosure.

Each multi-stage voltage conversion cycle includes down conversion of an input voltage from the power supply 202 to a plurality of intermediate voltages across the capacitive elements 212-218, which are subsequently provided to the inductive converter 206 to generate one or more one or more portions of a charging pulse for the battery 208. Therefore, each charging pulse is composed of a plurality of portions generated during a plurality of voltage conversion cycles.

Figure 2B:
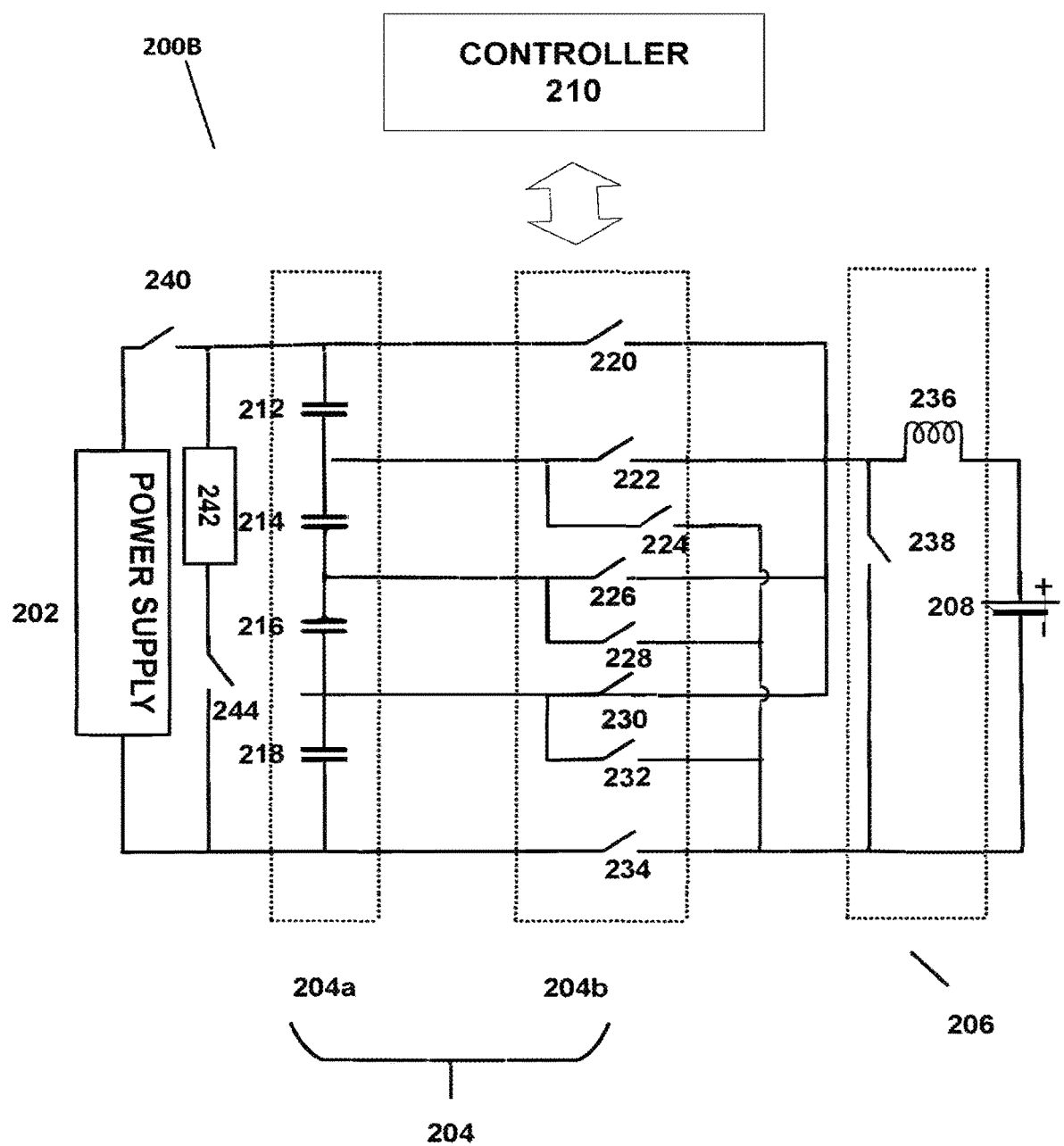
FIG. 2B illustrates another example of a battery charging system in accordance with the present disclosure.

FIG. 2B illustrates another example of a system to charge a battery in accordance with the present disclosure. The system 200B depicted in FIG. 2B is analogous to the system 200A illustrated in FIG. 2A. In addition to the components of the system 200A, the system 200B includes a power balancer 242 that is coupled between the power supply 202 and the capacitive voltage divider 204. The power balancer 242 can be controlled by the controller 210 to obtain power from the power supply 202. The controller 210 can control switching elements 240 and 244 to be turned ON and turned OFF to operatively couple the power balancer 242 to the power supply 202, and to the capacitive voltage divider 204. The controller 210 can enable the power balancer 242 to obtain power from the power supply during pause duration or OFF duration between the charging pulses. The switching elements 240 and 244 can be turned ON for the power balancer 242 to obtain power from the power supply 202.

The absorption of power by the power balancer 242 enables the continuous flow of power from the power supply 202. Therefore, the power balancer 242 enables maintaining a continuous flow of power, and balances power supplied by the power supply 202.

In some embodiments, a resistor can be used as the power balancer 242. The resistor may burn the surplus power, obtained from the power supply 202, which cannot be provided to the capacitive voltage divider 204 due to operational challenges associated with the voltage conversion at that point in time. In some embodiments, a capacitor may be used as the power balancer 242 that may consume power from the power supply 202, and become a source of the input voltage for the capacitive elements 212-218 of the capacitive voltage divider 204. In particular, the capacitor as the power balancer can charge itself from the power obtained from the power supply 202, and then discharges to charge the capacitive elements 212-218, thus providing input voltage to the capacitive voltage divider 204. The capacitor can be a super capacitor which may have higher capacitance values than the capacitive elements 212-218.

Figure 3:
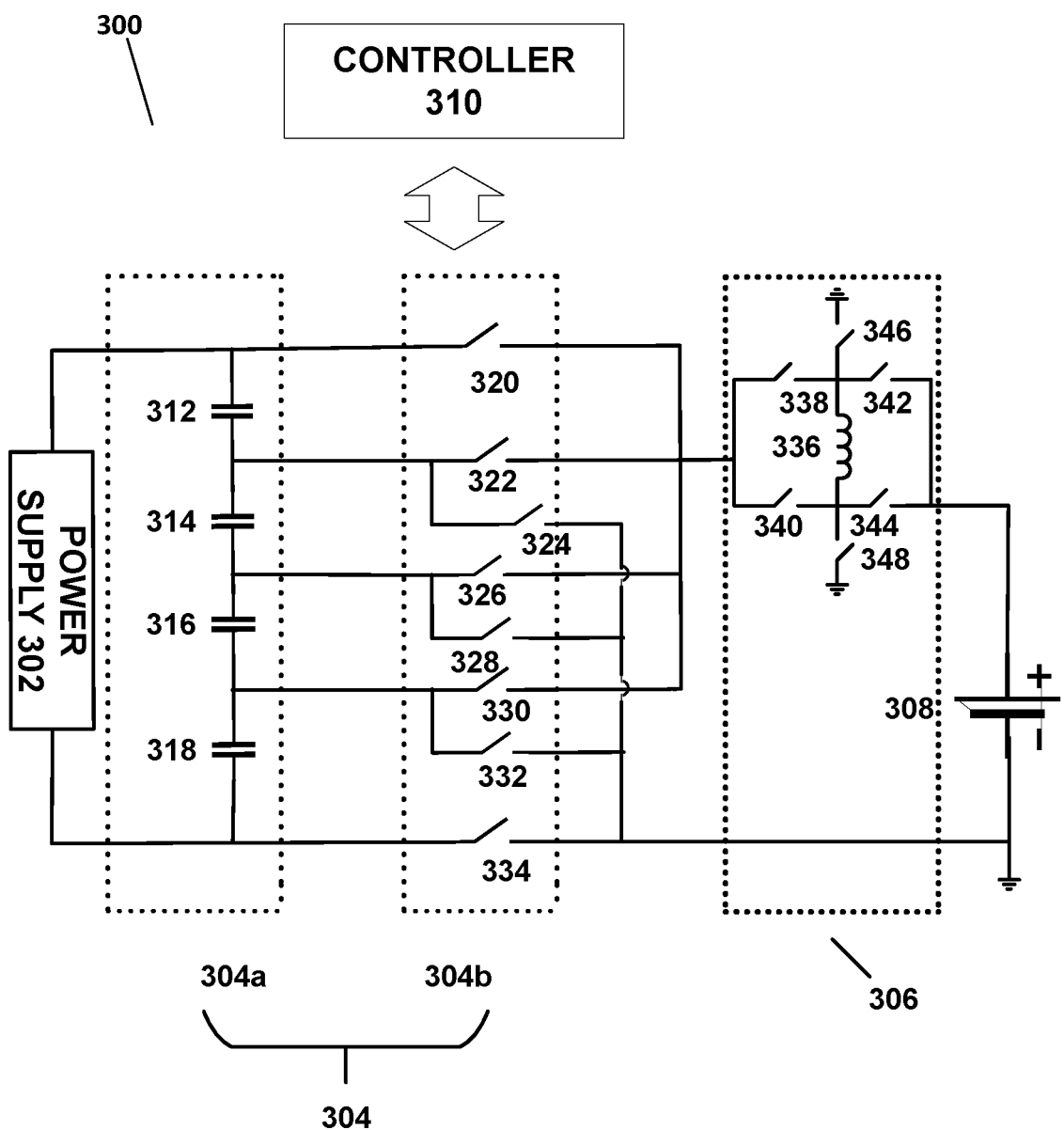
FIG. 3 illustrates another example of a battery charging system in accordance with the present disclosure.

FIG. 3 illustrates another example of a system to charge a battery in accordance with the present disclosure. The system 300 depicted in FIG. 3 is analogous to the system 200A illustrated in FIG. 2A. The capacitive voltage divider 304 of FIG. 3, is similar to the capacitive voltage divider 204 illustrated in FIG. 2A. The controller 310 is similar to the controller 210 and can control execution of voltage conversion cycles, as discussed above for system 200A, in accordance with the present disclosure. The topology of system 300 is different from that of the system 200A in an aspect that the inductive converter 306 includes a plurality of switching elements 338, 340, 342, 344, 346, and 348 that are operatively coupled to the inductive element 336. The switching elements 338-348 can be semiconductor switches. Similar to the inductive converter 206, the inductive converter 306 can be controlled by the controller 310 to generate multiple portions of the charging pulse in multiple voltage conversion cycles.

Similar to system 200, the capacitive voltage divider 304 of the system 300 divides the input voltage from the power supply 302 to generate a plurality of intermediate voltages in the first stage of voltage conversion. The second stage of the voltage-conversion begins by enabling flow of current through the inductive element 336. The flow of current corresponds to the intermediate voltages obtained from the capacitive voltage divider 304. Each of the plurality of intermediate voltages from the capacitive voltage divider 304 can be provided to the inductive element 336 by turning ON the switching elements 338 and 348, whereas rest of the switching elements 340, 342, 344, and 346 are turned OFF. The inductive element 336 is charged till the desired level, and then the controller 310 may start discharging of the inductive element 336 to generate the charging pulse for the battery 308. To provide current to the battery 308 through discharging of the inductive element 336, the switching element 344 is turned ON, the switching elements 340, 342 and 348 are kept OFF, and the switching elements 338 and 346 are alternatively turned ON and OFF. The frequency of alternating states of the switching elements 338 and 346 is based on desired peak-peak ripple of the inductor current.

The inductive converter 306 can also be controlled to apply negative current to the battery 308 i.e., the battery 308 can be discharged through the inductive converter 306. The current can be obtained from the battery 308 by controlling the states of the switching elements 338-348. To obtain current from the battery 308 i.e., to discharge the battery 308, the switching element 342 is turned ON, the switching elements 338, 344, and 346 are kept OFF, and the switching elements 340 and 348 are alternatively turned ON and OFF. The current obtained from the battery 308 by the inductive element 336 can be used to charge the capacitive elements 312-318.

It is to be understood that the inductive converter 306 can be controlled to operate in various modes, for example, but not limited to, buck mode, boost mode etc. The description of operation of the inductive converter 306 above is kept limited to an extent to get fundamental understanding of the present disclosure. The various operational and topology variations of the inductive converter 306, and thus the system 300, can be realized by a person of ordinary skill in the art.

Figure 4:
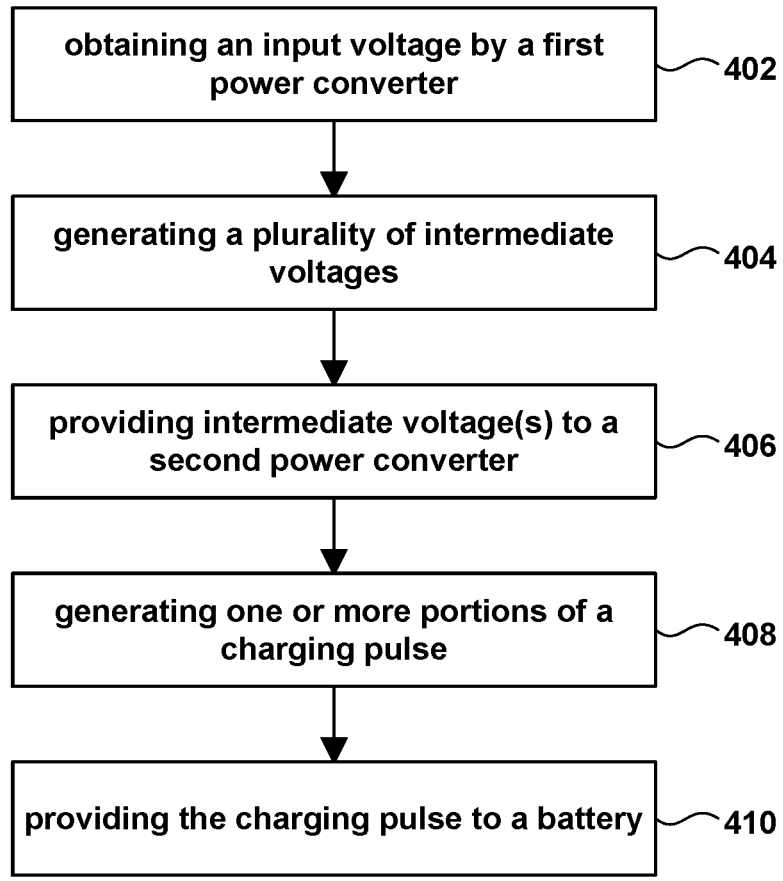
FIG. 4 illustrates a flow diagram of a battery charging process in accordance with the present disclosure.

Referring to FIG. 4, the discussion will now turn to a high level description of operations involved in charging of the battery 108 by two-stage voltage conversion in accordance with the present disclosure. The controller 110 can control execution of a plurality of voltage conversion cycles to provide a charging pulse to the battery 108. Each voltage conversion cycle includes multiple operations 402-410. The flow of such operations is not necessarily limited to the order of operations shown.

At block 402, the first power converter 104 obtains an input voltage from the power supply 102. The input voltage obtained from the power supply may have a value that is much higher than a voltage level that can be safely applied to the battery 108. At block 404, the first power converter 104 may divide the input voltage into a plurality of intermediate voltages. In some embodiments, the first power converter 104 is a capacitive voltage divider 204, and the number of intermediate voltages generated across the capacitive voltage divider 204 depends upon a number of capacitive elements included in the capacitive voltage divider. Each intermediate voltage value can be same or different depending upon whether the capacitive elements used in the capacitive voltage divider have similar capacitance values or not.

At block 406, one or more of the plurality of intermediate voltages are provided to the second power converter 106. The intermediate voltages can be provided either sequentially or cumulatively based on value of voltage that needs to be provided to the second power converter to obtain a charging pulse of specific (desired) characteristics. When the first power converter 104 is a capacitive voltage divider 204 having a switching matrix 204b, the controller 210 can control states of switching elements 220-234 to provide the one or more intermediate voltages to the second power converter 206.

At block 408, the second power converter 106 generates one or more portions of the charging pulse based on the one or more intermediate voltages received from the first power converter 104. Each charging pulse applied to the battery is made up of a plurality of portions which are generated in plurality of multi-stage voltage conversion cycles as discussed above. Each of the multiple portions of the charging pulse may correspond to different voltage levels that are obtained by coordinated switching between the switching elements of the first power converter and the switching element(s) of the second power converter. For example, by controlling the switching elements 220-234 and the switching element 238, the discharging of the capacitive elements 212-218 and amount of current flowing through the inductive element 236 can be varied, and thereby the charging pulse having different portions corresponding to different voltages can be generated.

At 410, in each voltage conversion cycle, the controller 110 may provide one or more portions of the charging pulse generated during the voltage conversion cycle to the battery 108. When the second power converter 106 is the inductive converter 206, the controller 210 may control the state (ON or OFF) of the switching element 238 to vary charging pulses applied to the battery 208. Similarly when the second power converter 106 is the inductive converter 306, the controller 310 may control the states of the switching elements 338-348 to provide charging pulses to the battery 308.

It is to be noted that FIGS. 2A, 2B, and 3 illustrate a capacitive voltage divider with four capacitive elements and four pairs of switching elements, each pair of switching elements corresponds to one of the capacitive elements. However, it is to be noted that the number of capacitive elements, and the number switching elements are not fixed, and can be varied to divide the input voltage into a ratio as preferred. For example, if the input voltage V is to be divided into V/3, three capacitive elements can be used. The number of switching elements corresponding to the capacitive elements can be varied accordingly. Hence, the number of capacitive elements, switching elements, inductive element can be modified by a person of ordinary skill in the art to realize different variations of the described multi-stage voltage conversion system for battery charging. Such modifications are within the spirit and scope of the present disclosure. Few examples of such variations are illustrated and discussed with respect to FIGS. 5-7.

Figure 5:
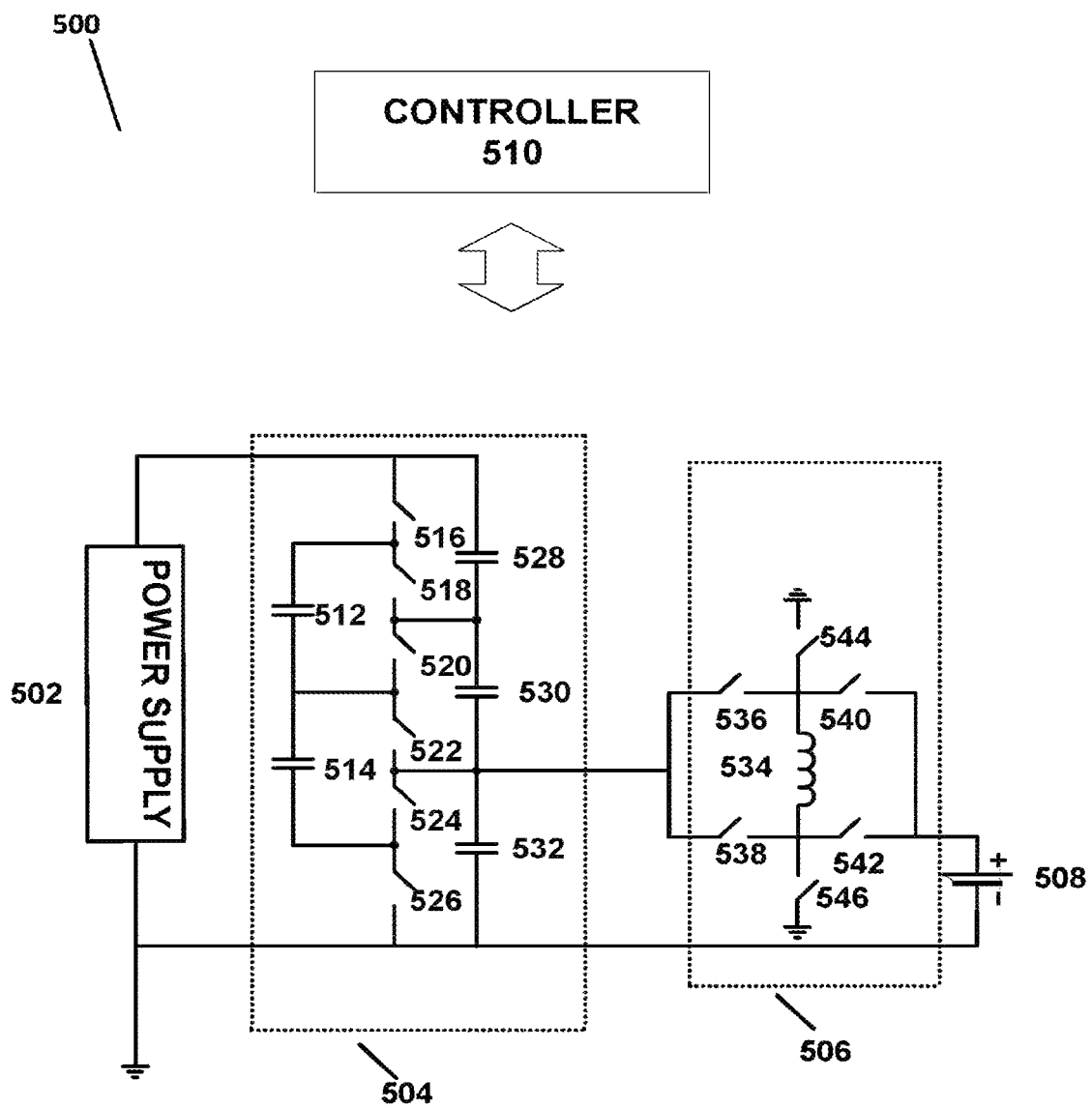
FIG. 5 illustrates another example of a battery charging system in accordance with the present disclosure.

FIG. 5 illustrates another example of a system 500, including multi-stage voltage conversion circuitry, to charge the battery in accordance with the present disclosure. The system 500 includes a controller 510 which is analogous to the controller 210 described with respect to FIGS. 2A and 2B. The controller 510 may perform similar functions as the controller 210 to control charging of the battery 508 in accordance with the present disclosure. The system 500 includes a flying capacitor based capacitive voltage divider 504 as the first power converter. The capacitive voltage divider 504 includes capacitive elements 528, 530, and 532 connected in series with each other. The capacitive voltage divider 504 also includes flying capacitors 512 and 514 connected in series with each other, and are operatively connected in parallel with the capacitive elements 528, 530, and 532. The flying capacitors 512 and 514 are provided to balance charge levels in the capacitive elements 528, 530, and 532. The flow of charge between the flying capacitors 512 and 514 and the capacitive elements 528, 530, and 532 is controlled by a plurality of switching elements 516, 518, 520, 522, 524, and 526 connected between the flying capacitors and the capacitive elements. For example, when the switching elements 516, 520, and 524 are turned ON (with the switching elements 518, 522, and 526 being OFF), the flying capacitor 512 and the capacitive element 528 become connected in parallel, and the flying capacitor 514 and 530 become connected in parallel, and thus the charge levels in the flying capacitor 512 and the capacitive element 528 become similar, and the charge levels in the flying capacitor 514 and the capacitive element 530 become similar. Similarly, when the switching elements 518, 522, and 526 are turned ON (with the switching elements 516, 520, and 524 being OFF), the flying capacitor 512 and the capacitive element 530 become connected in parallel, and the flying capacitor 514 and the capacitive element 532 become connected in parallel, and thus the charge levels in the flying capacitor 512 and 530 become similar, and the charge levels in the flying capacitor 514 and the capacitive element 532 become similar. Hence, by alternating between the turning ON of a group of the switching elements 516, 520, and 524, and another group of the switching elements 518, 522, and 526, the capacitive elements 528, 530, and 530 can be maintained at similar charge levels. The controller 510 may control switching frequency of the switching elements 516-526.

The system 500 includes an inductive converter 506 as the second power converter. The inductive converter 506 is operatively coupled to the capacitive voltage divider 504. The inductive converter 506 is analogous to the inductive converter 306 illustrated in FIG. 3, and thus can be controlled by the controller 510 in a similar manner to perform voltage conversion and battery charging as discussed for the inductive converter 306. As such, the inductive converter 506 is capable of providing current to the battery 508, and obtaining current from the battery 508. The inductive converter 506, by virtue of the associated switching topology, may change direction of current to the battery 508 without changing direction of current in the inductive element 534.

The controller 510 controls the capacitive voltage divider 504 to obtain an input voltage from the power supply 502. The input voltage obtained by the capacitive voltage divider 504 is divided, by virtue of the plurality of capacitive elements 528-532 connected in series with each other, to generate a plurality of intermediate voltages across the capacitive elements 528-532. The conversion of the input voltage to the intermediate voltages is a first stage of the two-stage voltage conversion in accordance with the present disclosure. The intermediate voltages across 528-532 are provided to the inductive converter 506 through the capacitive element 532. When the capacitive element 532 discharges to provide the intermediate voltage across the capacitive element 532 to the inductive converter 506, the controller 510 may control states of the switching elements 516-526 as discussed above to balance the charge levels in the capacitive elements 528-532, thereby enabling the capacitive element 532 to continuously provide the intermediate voltage to the inductive converter 506.

The second stage of the voltage-conversion begins by enabling flow of current through the inductive element 534. The intermediate voltage from the capacitive element 532 is provided to the inductive element 534 by turning ON the switching elements 536 and 546, whereas rest of the switching elements 538, 540, 542, and 544 are turned OFF. The inductive element 534 is charged till the particular level, and then the controller 510 may start discharging the inductive element 534 to generate the charging pulse for the battery 508. To provide current to the battery 508 through discharging of the inductive element 534, the switching element 542 is turned ON, the switching elements 538, 540 and 546 are kept OFF, and the switching elements 536 and 544 are alternatively turned ON and OFF. The frequency of alternating states of the switching elements 536 and 544 is based on desired peak-peak ripple of the inductor current.

The inductive converter 506 can also be controlled to apply negative current to the battery 508 i.e., the battery 508 can be discharged through the inductive converter 506. The current can be obtained from the battery 508 by controlling the states of the switching elements 536-546. To obtain current from the battery 508 i.e., to discharge the battery 508, the switching element 540 is turned ON, the switching elements 536, 542, and 544 are kept OFF, and the switching elements 538 and 546 are alternatively turned ON and OFF. The current obtained from the battery 508 by the inductive element 534 can be used to charge the capacitive element 532. The system 500 is capable of applying positive as well as negative charging pulses to the battery 508.

Figure 6:
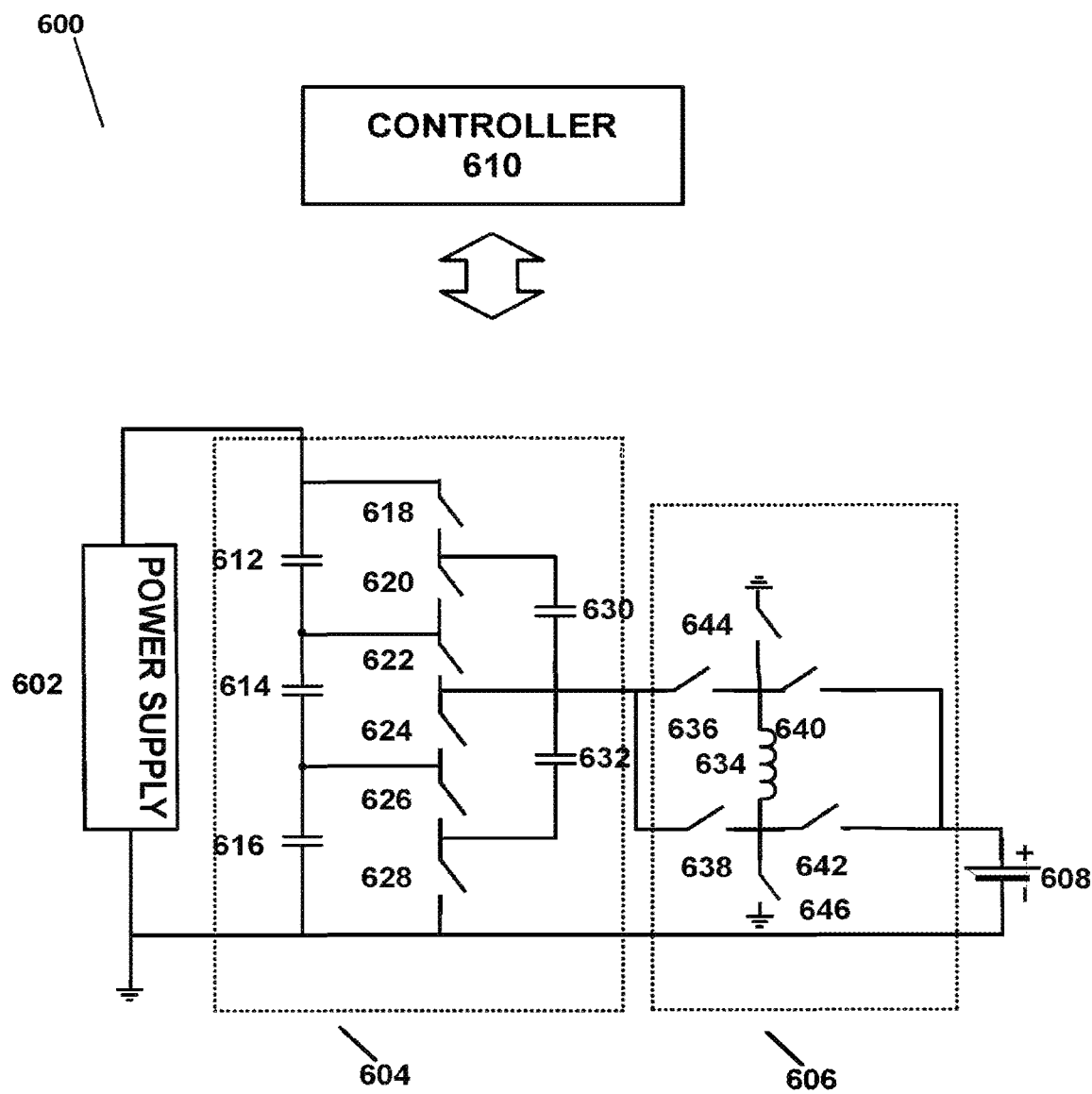
FIG. 6 illustrates another example of a battery charging system in accordance with the present disclosure.

FIG. 6 illustrates another example of a system 600, including multi-stage voltage conversion circuitry, to charge the battery in accordance with the present disclosure. Similar to the system 500, the system 600 includes a flying capacitor based capacitive voltage divider 604 as the first power converter, and the inductive converter 606 as the second power converter. Operationally, the system 600 is also similar to the system 500 i.e., the input voltage obtained from the power supply 602 is down converted to the intermediate voltage(s) by the capacitive voltage divider 604, and the intermediate voltage is down-converted by the inductive converter 606 to the generate the charging pulses for the battery 608.

The topology of the system 600 is different from the topology of the system 500 in a manner in which the inductive converter 606 is connected to the capacitive voltage divider 604. In the system 600, the intermediate voltages across capacitive elements 614 and 616 can be provided to the inductive converter 606. The combined intermediate voltage across 614 and 616 can also be provided to the inductive converter 606. When the switching elements 618, 622 and 626 are turned ON (with the switching elements 620, 624 and 628 being OFF) the intermediate voltages across the capacitive elements 614 and 616 is provided to the inductive converter 606. When the switching elements 620, 624, and 628 are turned ON (with the switching elements 618, 622, and 626 being OFF), the intermediate voltage across the capacitive element 616 is provided to the inductive converter 606. Rest of the operations can be performed for the voltage conversion similarly as discussed above for FIG. 5.

Figure 7:
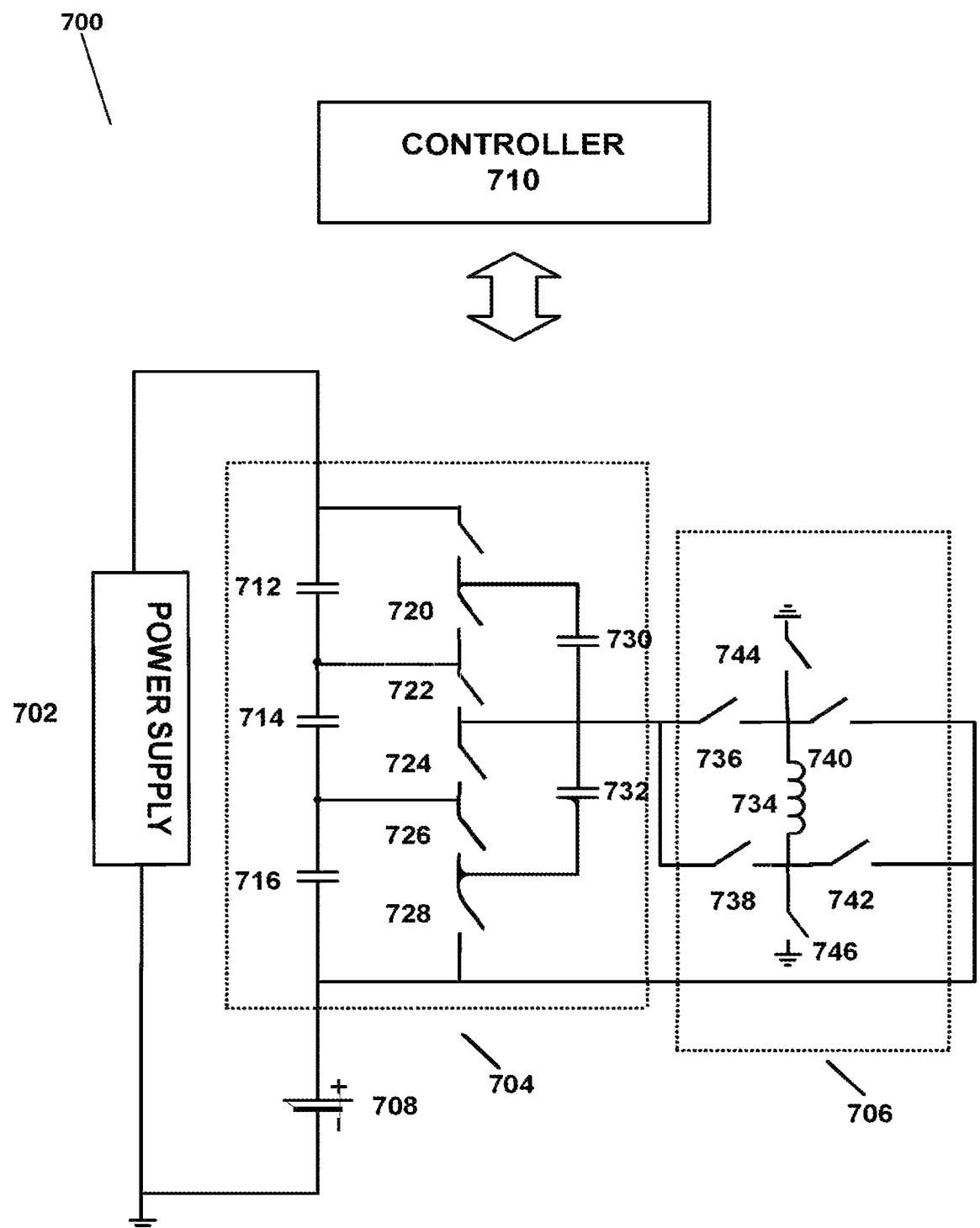
FIG. 7 illustrates another example of a battery charging system in accordance with the present disclosure.

FIG. 7 illustrates another example of a system 700, including multi-stage voltage conversion circuitry, to charge the battery 708 in accordance with the present disclosure. The system 700 is operationally analogous to the system 500 and 600. The topology of the system 700 is different from the topology of the system 600 in a manner in which battery 708 is connected. As can be seen in FIG. 7, the battery 708 is connected in series with the capacitive elements 712, 714, and 716 of the capacitive voltage divider 704. Hence, voltage across each of the capacitive element 712-716 is (Vg-V batt)/3 where Vg is the input voltage from the power supply and Vbatt is the batter voltage of the battery 708. The reduction of the voltage across the capacitive elements 712-716 due to connection of battery 708 in series reduces voltage stress of the capacitive elements 712-716 and the switching elements 718-728. The system 700 can be similarly controlled by the controller 710 as described for systems 500 and 600.

It is to be noted that that connection of the inductive converter to the capacitive voltage divider as shown in FIGS. 5-7 can be modified using a switch network or a switching matrix. For example, the switching matrix 204B as shown in FIGS. 2A and 2B can be used for providing multiple connections between the capacitive voltage divider and the inductive converter. All such variations in a manner in which the voltage capacitive divider and the inductive converter are to be connected are within spirit and scope of the present disclosure.

Figure 8A:
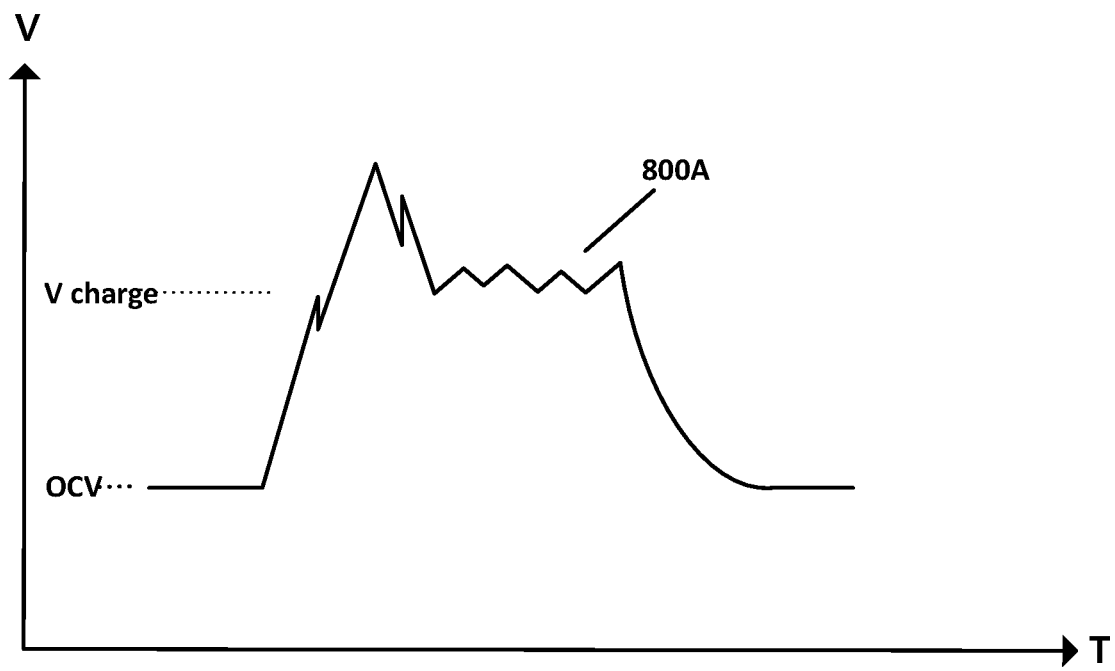
FIGS. 8A and 8B illustrate examples of voltage and currents waveforms, respectively, of a charging pulse generated in accordance with the present disclosure.

FIG. 8A depicts voltage variation in an exemplary charging pulse that is generated in accordance with the present disclosure. As can be seen in FIG. 8A, the charging pulse 800A is formed of multiple portions that correspond to multiple voltage conversion cycles described in the present disclosure. OCV represents an open circuit voltage of the battery, and Vcharge represents charging voltage to be provided to the battery 208. As can be seen in FIG. 8A, the different portions of the charging pulse correspond to different voltage levels that are obtained by controlling states of the switching elements of the first power converter and the second power converter. The beginning of the charging pulse has higher voltage than the rest of the charging pulse. Such variation in voltage can be achieved by varying the intermediate voltage provided from the first power converter to the second power converter i.e., by controlling the switching elements associated with the first voltage controller, the intermediate voltage provided at the beginning of the charging pulse is higher than the intermediate voltage provided to build rest of the charging pulse. Such high voltage at the beginning of the charging pulse can be higher than Vcharge level specified for the battery and is provided for a very short time, for example for few nanoseconds. For example, if the Vcharge is 4.2V for the battery, the voltage at the beginning of the charging pulse can be 7V to overcome battery inductance and such high voltage is provided for few nanoseconds. The described multi-stage voltage conversion system enables customization of a rising edge, a pulse plateau (pulse top), and a falling edge of the charging pulse due to components in the voltage conversion circuitry that can be easily controlled to vary the pulse characteristics.

Figure 8B:
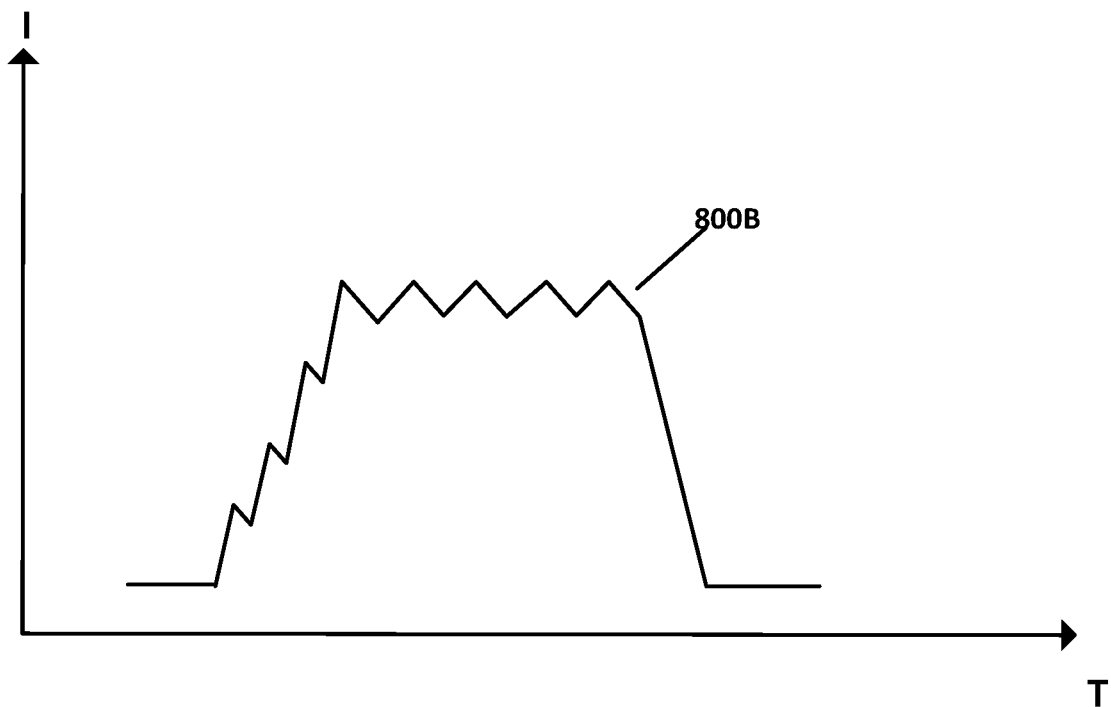
Figure 2A:
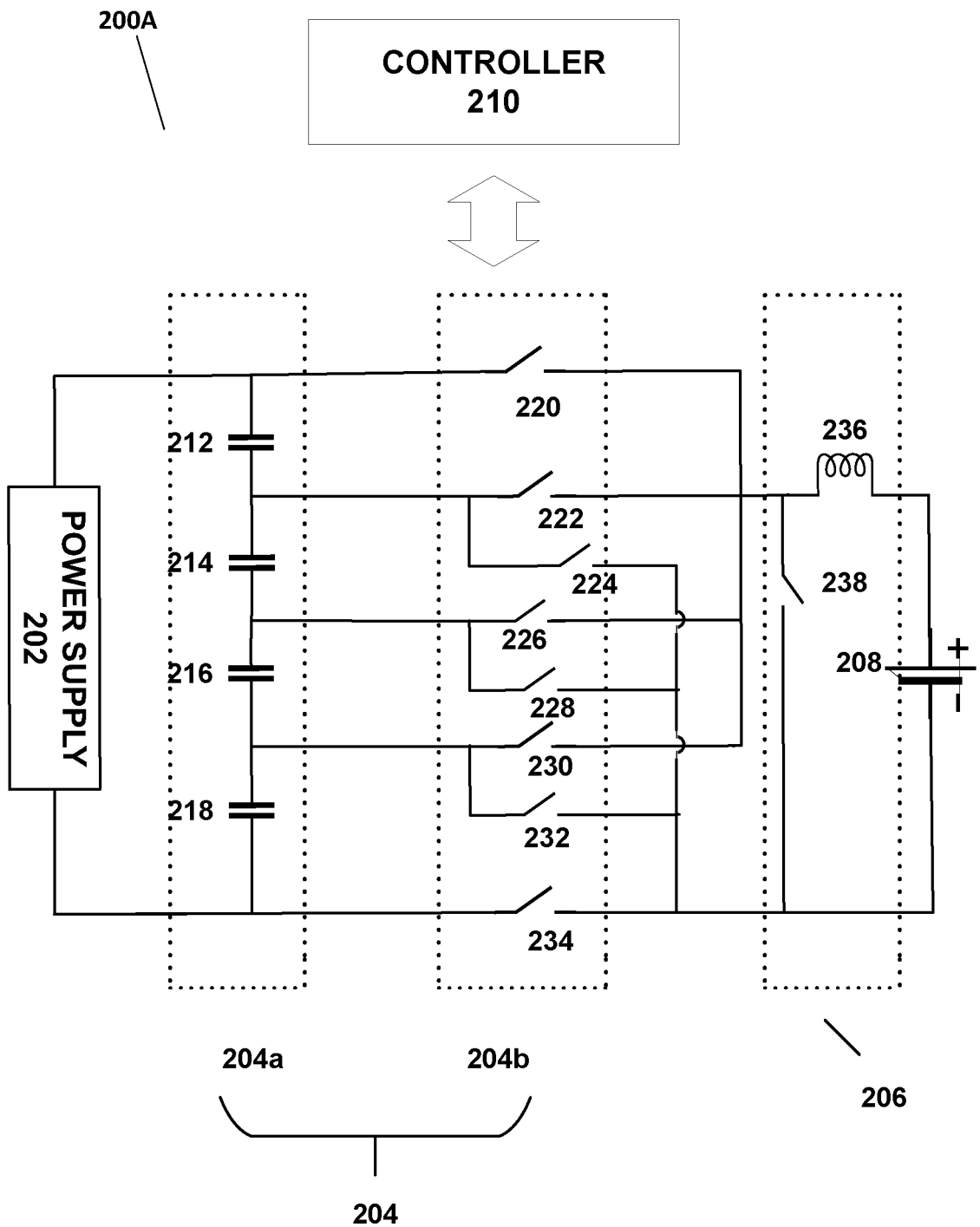
Figure 2B:
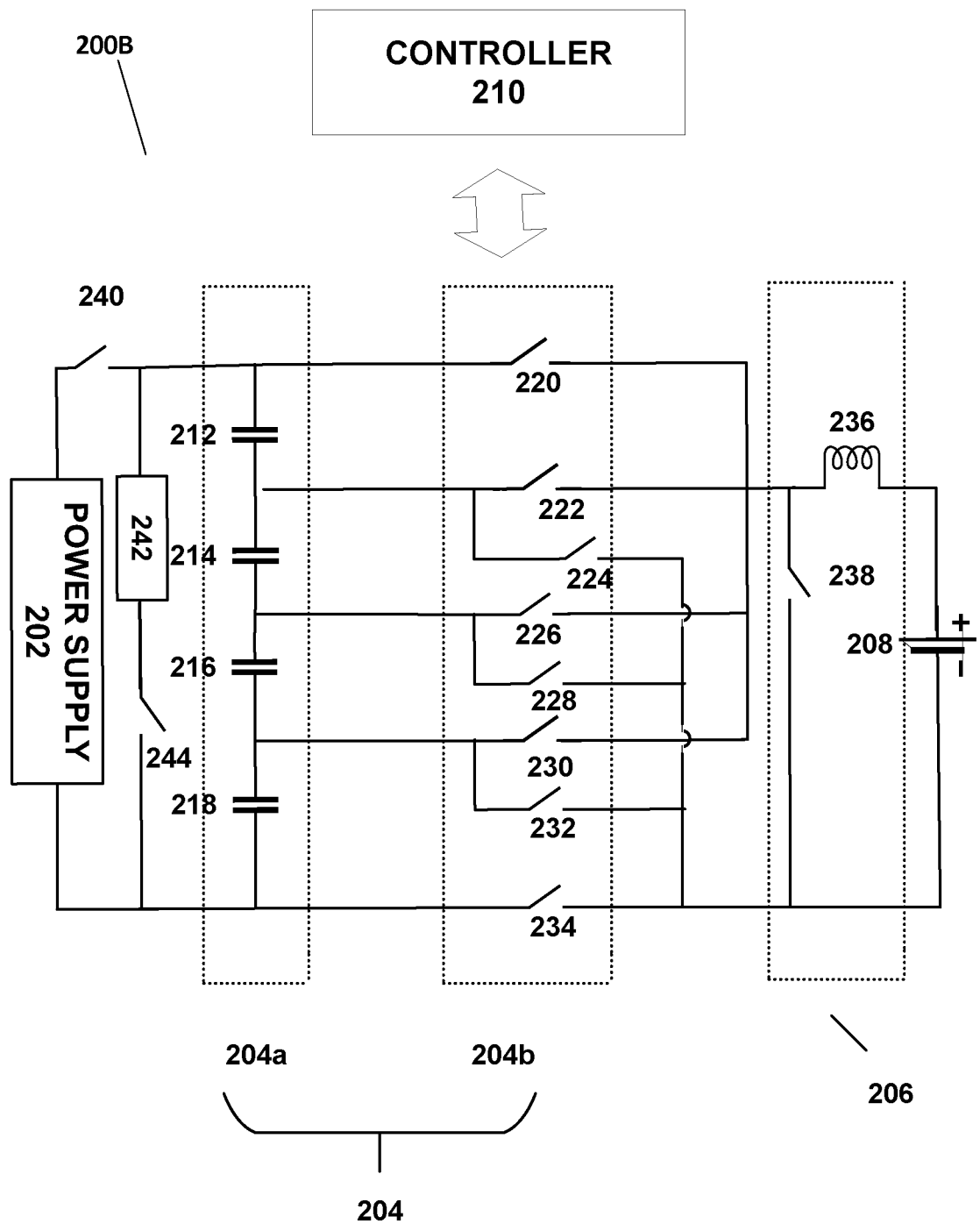
Figure 3:
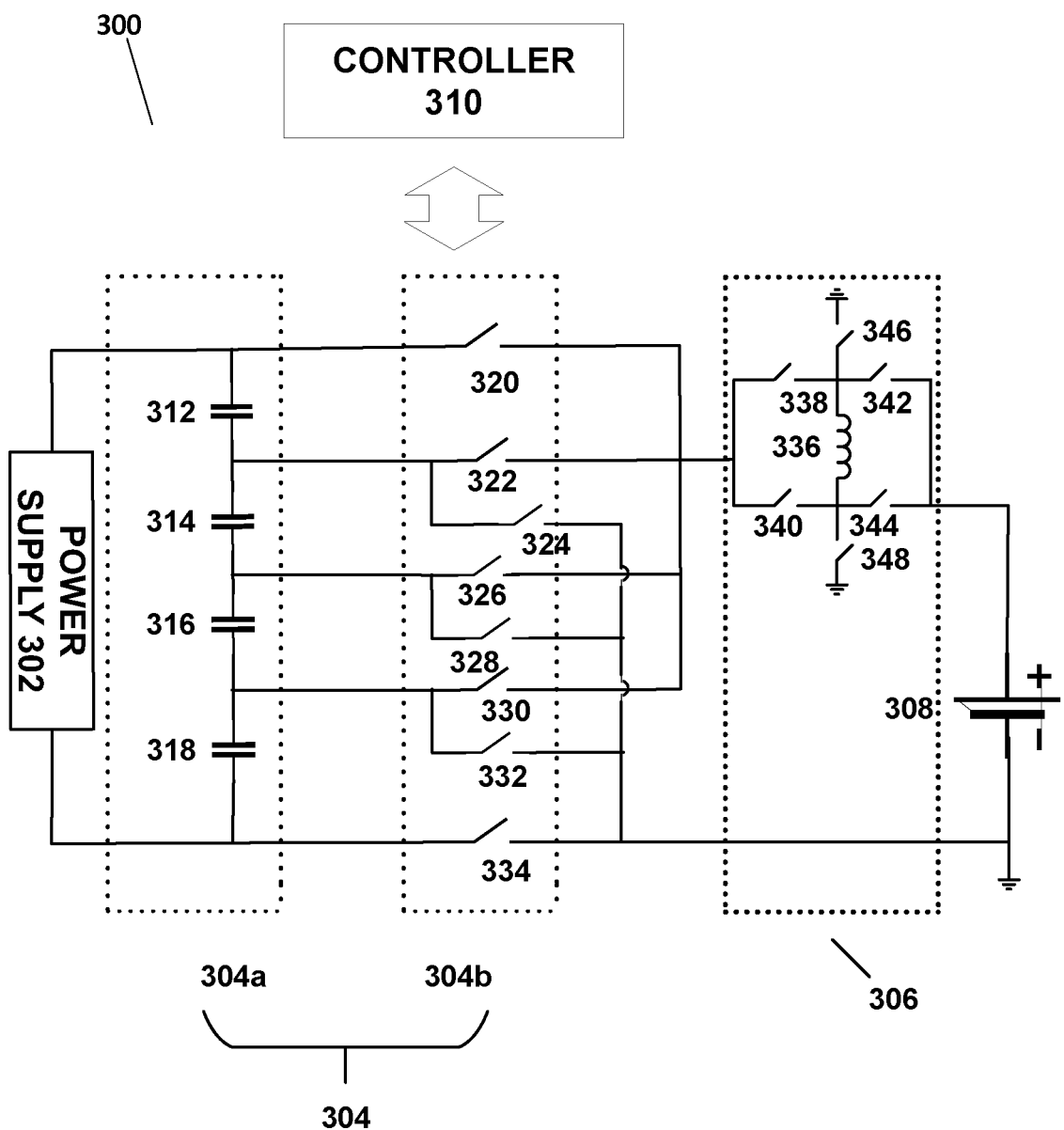
Figure 4:
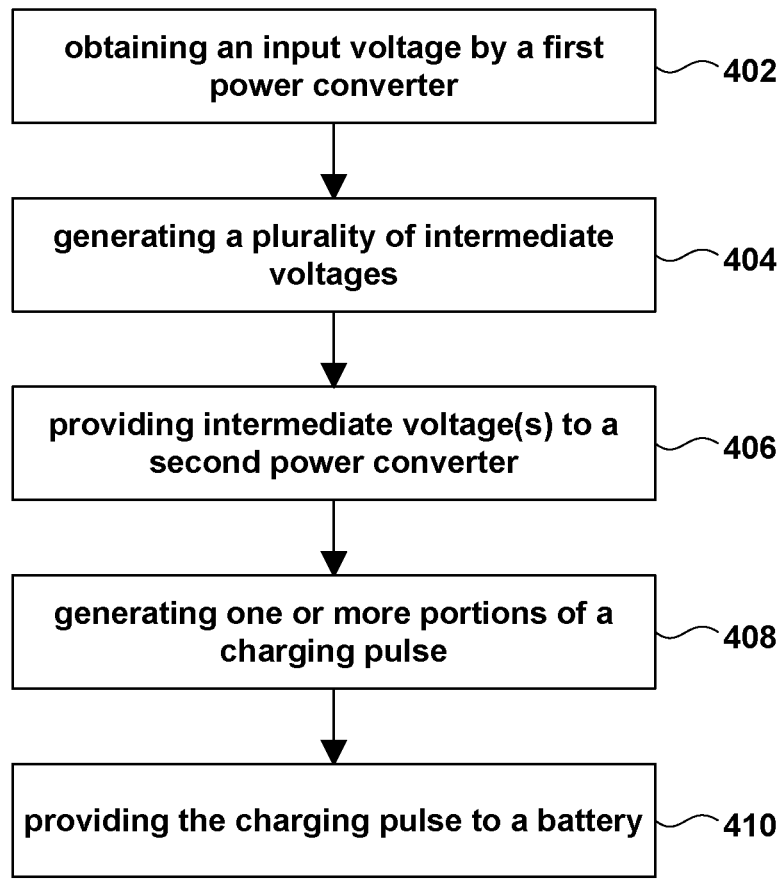
Figure 5:
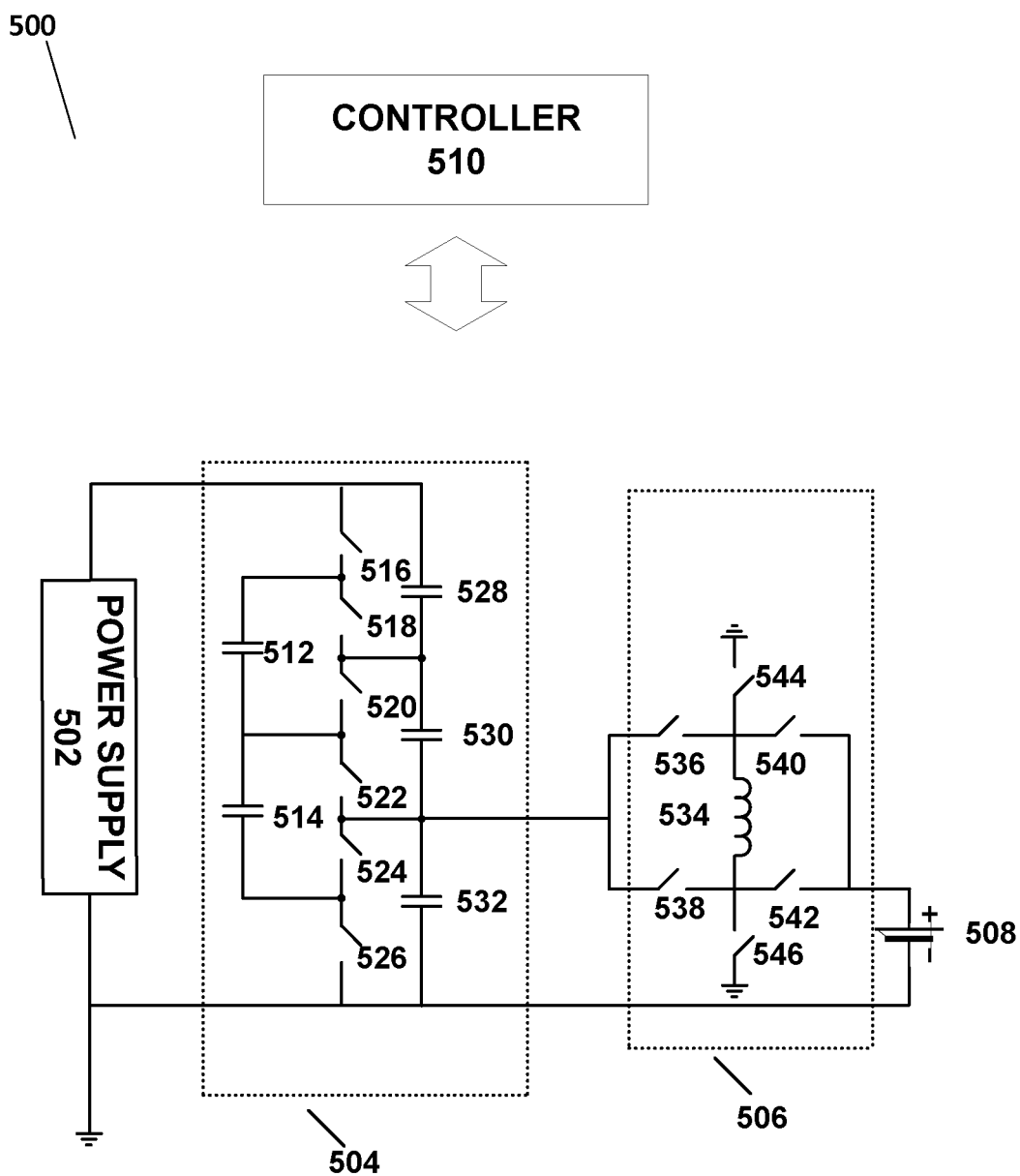
Figure 6:
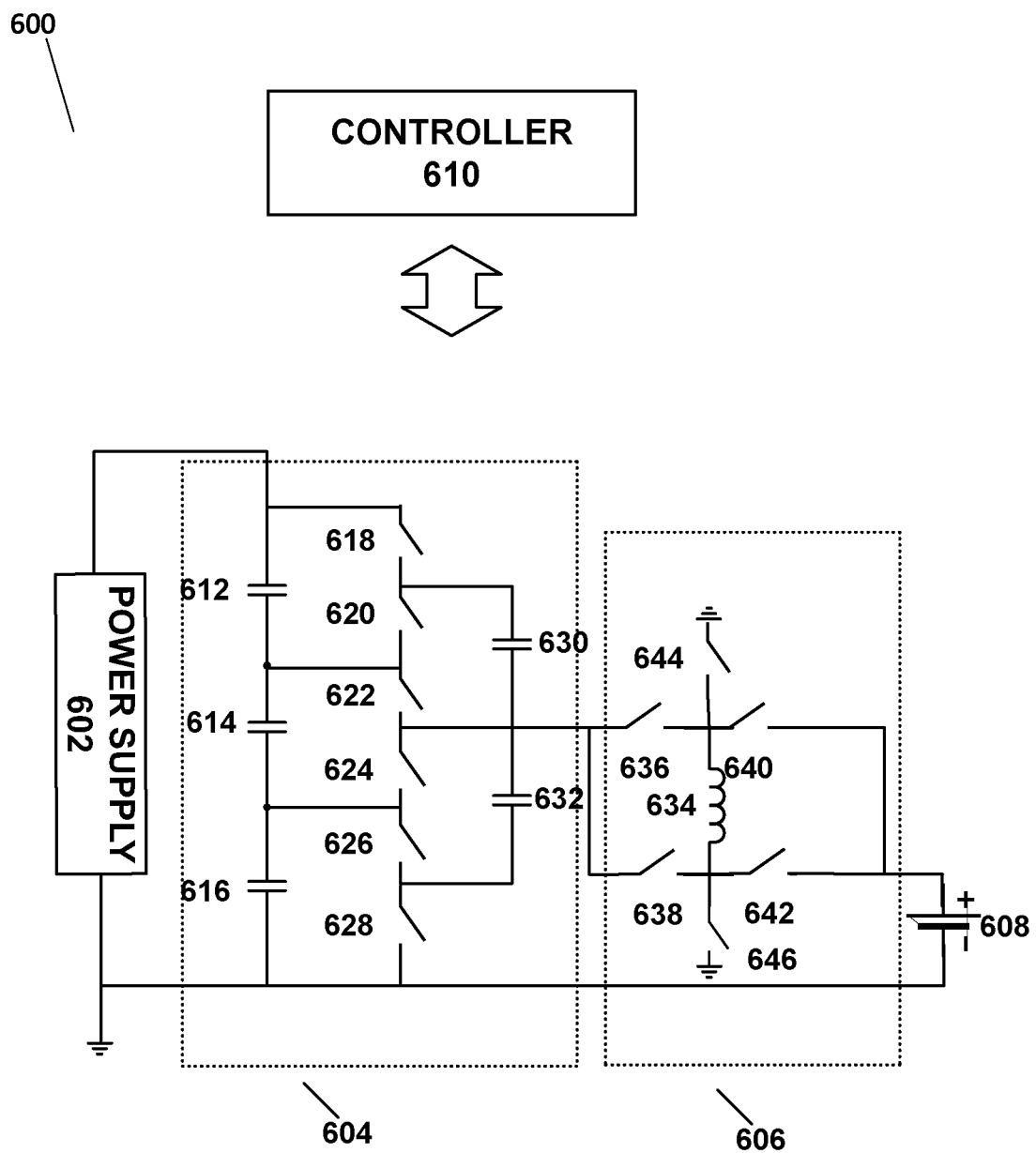
Figure 7:
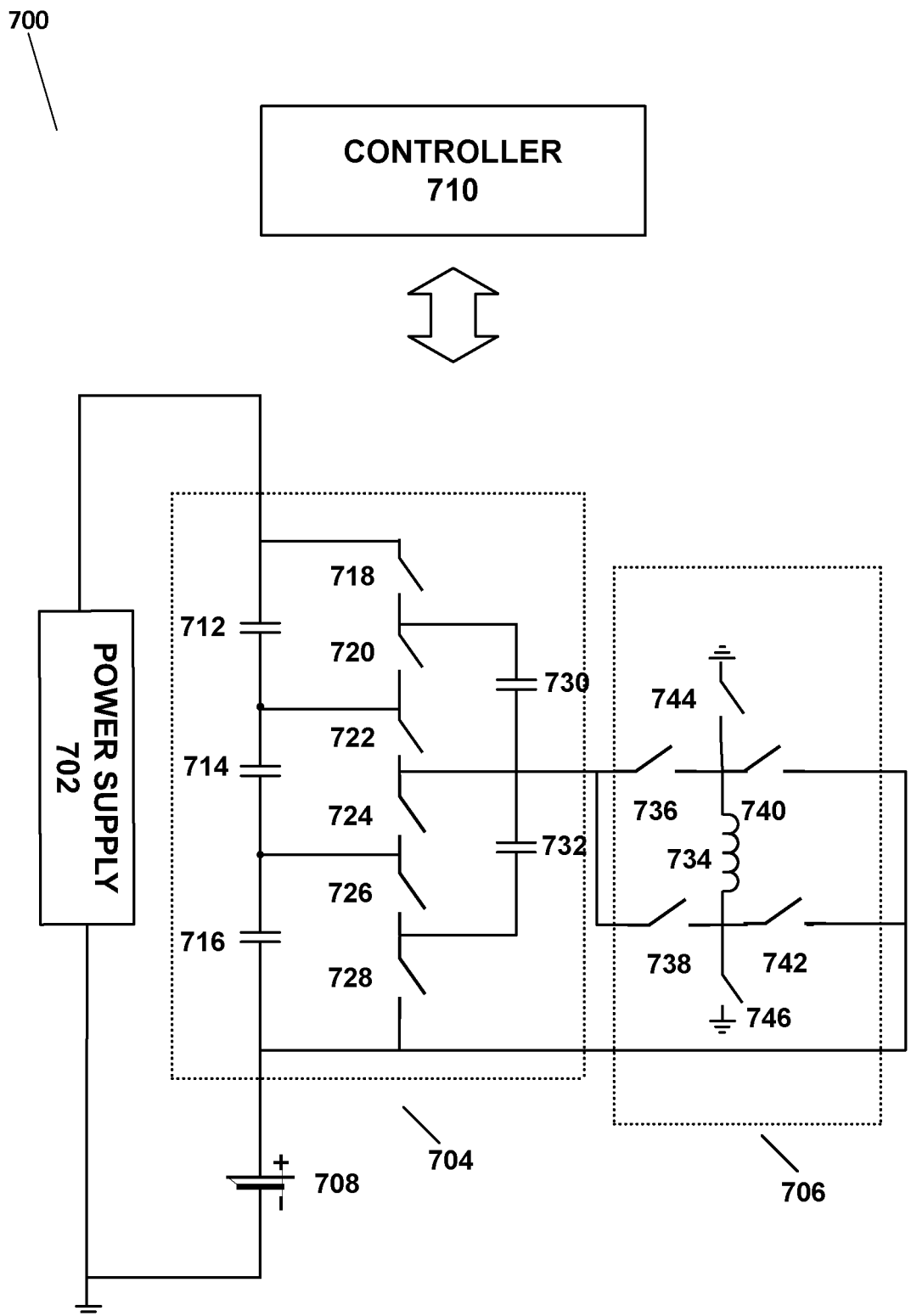
Figure 8A:
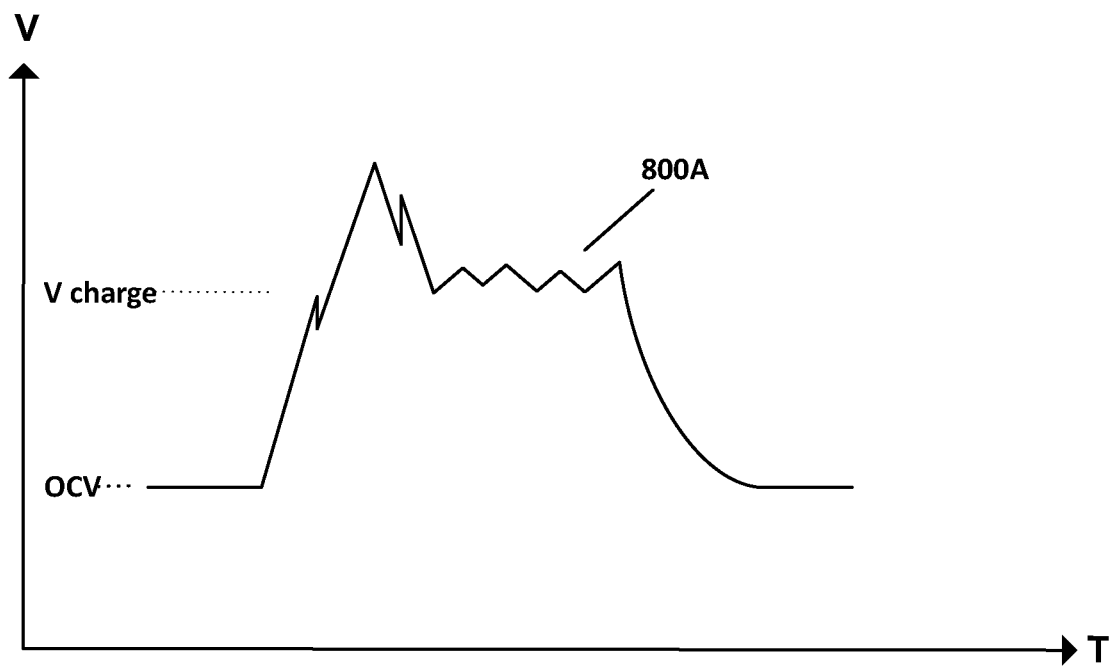
Figure 8B:
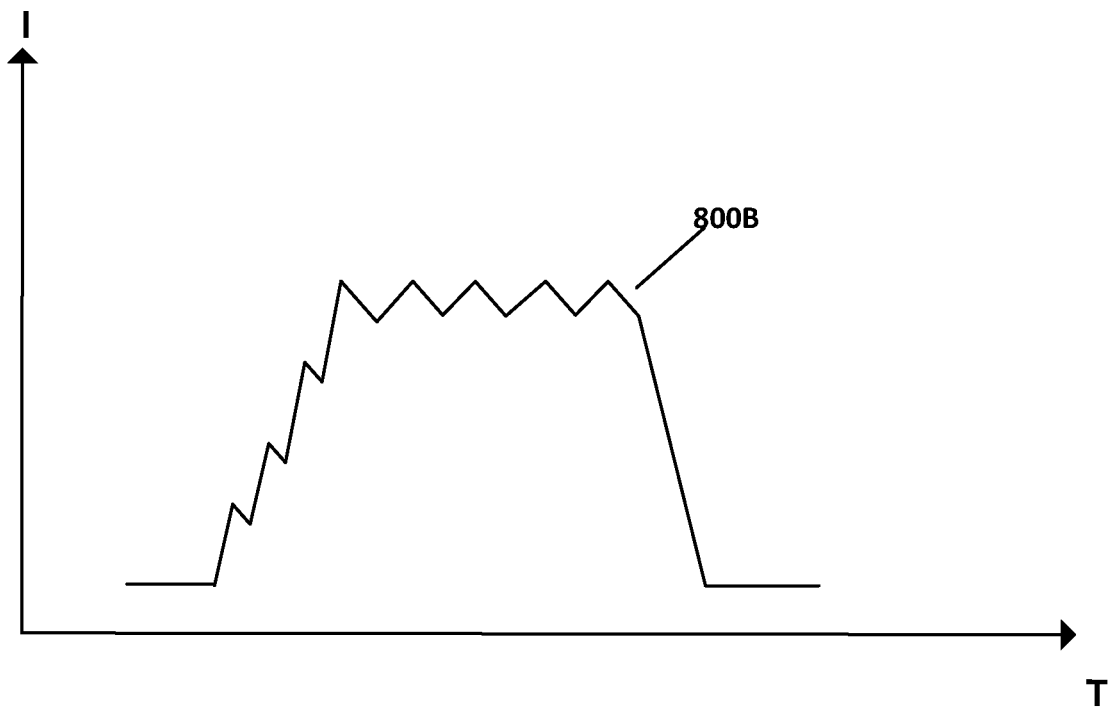

The variation in current of such exemplary charging pulse is depicted in FIG. 8B. The current waveform can be seen to be built of multiple portions corresponding to the plurality of voltage conversion cycles used in generation of the charging pulse.

The controller may control switching frequency of the various switching elements employed in the voltage conversion circuitries to generate charging pulses of varying characteristics. For example, the charging pulses having rising time in range of 50 nanoseconds to 5 milliseconds can be generated in accordance with the present disclosure. Also, the pulse duration of the charging pulses can be in the range of 50 nanoseconds to 100 microseconds. The pause duration between the charging pulses can be in the range of 50 nanoseconds to 100 microseconds. The charging pulses can be periodic or non-periodic, symmetrical or non-symmetrical. The above discussed values of various pulse characteristics are exemplary and are not limited to the stated ranges.

A person of ordinary skill in the art will appreciate that the battery charging system as described in various embodiments may be implemented using one or more integrated circuits (ICs). All the components of the system may be implemented on a single IC, or the components can be implemented on multiple ICs that can be operatively coupled. The one or more integrated circuits realizing the multi-stage voltage conversion system in accordance with the present disclosure may be implemented on a chipset. For example, the first power converter can be implemented on a first IC, and the second power converter can be implemented on another IC, whereas the first IC and the second IC are implement on a single chipset. The chipset can be a part of a battery pack. In case of single battery cell batteries, the chipset can be housed with the battery cell.

Further, the present disclosure utilizes multiple power converters having passive energy storage elements and switching elements to down-convert the voltage in multiple stages for charging the battery. The passive energy storage elements and the switching elements can be controlled to generate charging pulses of varying characteristics. The multi-stage down conversion of the input voltage improves efficiency of the voltage conversion system as whole. The use of the capacitive voltage divider as the first power converter increases the power density of the voltage conversion system as whole, thus making it suitable for size constrained applications such as portable devices, laptops, mobile devices, tablets etc. Further, the use of passive energy storage elements and the switching elements provides a cost effective way of improving speed of charging the battery through the voltage conversion.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. A system to charge a battery, the system comprising:
   a first power converter, wherein the first power converter includes a capacitive voltage divider, and wherein the capacitive voltage divider includes:
      a plurality of capacitive elements connected in series with each other; and
      a switching matrix that includes a plurality of first switching elements that are associated with the plurality of capacitive elements;
   a second power converter, wherein the second power converter includes an inductive converter, wherein the inductive converter includes at least one inductive element, and a plurality of second switching elements associated with the at least one inductive element, and wherein one or more switching elements of the plurality of second switching elements are connected to each other and to an output of the capacitive voltage divider; and
   a controller configured to:
      control execution of a plurality of voltage conversion cycles to provide a charging pulse to the battery, wherein each voltage conversion cycle includes operations to:
      obtain, from a power supply by the first power converter, an input voltage;
      generate, by the first power converter, based on the input voltage, a plurality of intermediate voltages;
      provide, to the second power converter, one or more of the plurality of intermediate voltages; and
      generate, by the second power converter, based on the one or more of the plurality of intermediate voltages, one or more portions of the charging pulse; and
      provide a plurality of portions of the charging pulse, generated during the plurality of voltage conversion cycles, to the battery,
      wherein the controller is further configured to control the inductive converter and the plurality of second switching elements to change a direction of current to the battery without changing a direction of current in the inductive element, whereby the inductive converter is capable of providing current to the battery and obtaining current from the battery, and wherein by keeping the direction of current in the inductive element unchanged, the controller is configured to change the direction of current to the battery instantaneously.

2. The system of claim 1, wherein the operation to generate, by the first power converter, a plurality of intermediate voltages includes at least one operation to divide the input voltage, by the capacitive voltage divider, into the plurality of intermediate voltages.

3. The system of claim 1, wherein the operation to provide, to the second power converter, the one or more of the plurality of intermediate voltages includes at least one operation to:
   discharge one or more of the plurality of capacitive elements; and
   control one or more of the plurality of first switching elements to provide the plurality of intermediate voltages to the second power converter.

4. The system of claim 1, wherein the operation to provide, to the second power converter, the one or more of the plurality of intermediate voltages includes at least one operation to provide the plurality of intermediate voltages sequentially.

5. The system of claim 1, wherein the operation to generate, by the second power converter, the one or more portions of the charging pulse includes at least one operation to charge the at least one inductive element to a specific level.

6. The system of claim 5, wherein the specific level is based on pulse characteristics of the charging pulse.

7. The system of claim 1, wherein the operation to provide the plurality of portions of the charging pulse, generated during the plurality of voltage conversion cycles, to the battery includes at least one operation to control states of the plurality of second switching elements associated with the at least one inductive element.

8. The system of claim 1, wherein the controller is a battery management system (BMS) controller.

9. The system of claim 1, further comprising a power balancer that is configured to balance power supplied by the power supply.

10. A method to charge a battery, the method comprising:
controlling, by a controller, execution of a plurality of voltage conversion cycles to provide a charging pulse to the battery, wherein each voltage conversion cycle includes:
obtaining, from a power supply by a first power converter, an input voltage wherein the first power converter includes a capacitive voltage divider, and wherein the capacitive voltage divider includes:
a plurality of capacitive elements connected in series with each other; and
a switching matrix that includes a plurality of first switching elements that are associated with the plurality of capacitive elements;
generating, by the first power converter, based on the input voltage, a plurality of intermediate voltages;
providing, to a second power converter from the first power converter, one or more of the plurality of intermediate voltages, wherein the second power converter includes an inductive converter, wherein the inductive converter includes at least one inductive element, and a plurality of second switching elements associated with the at least one inductive element, and wherein one or more switching elements of the plurality of second switching elements are connected to each other and to an output of the capacitive voltage divider; and
generating, by the second power converter, based on the one or more of the plurality of intermediate voltages, one or more portions of the charging pulse; and
providing, by the controller, a plurality of portions of the charging pulse, generated during the plurality of voltage conversion cycles, to the battery,
wherein the method further comprises controlling the inductive converter and the plurality of second switching elements to change a direction of current to the battery without changing a direction of current in the inductive element, whereby the inductive converter is capable of providing current to the battery and obtaining current from the battery, and wherein by keeping the direction of current in the inductive element unchanged, the direction of current to the battery is changed instantaneously.

11. The method of claim 10, wherein generating the plurality of intermediate voltages includes dividing the input voltage into the plurality of intermediate voltages across the plurality of capacitive elements.

12. The method of claim 10, wherein providing the one or more of the plurality of intermediate voltages includes:
discharging one or more of the plurality of capacitive elements; and
controlling one or more of the plurality of first switching elements.

13. The method of claim 10, wherein generating the one or more portions of the charging pulse includes charging the at least one inductive element for a specific time period.

14. The method of claim 13, wherein the specific time period is based on pulse characteristics of the charging pulse.

15. The method of claim 10, wherein providing the one or more of the plurality of intermediate voltages includes discharging one or more of the plurality of capacitive elements to provide current flow through the at least one inductive element, and wherein discharging the one or more of the plurality of capacitive elements includes switching states of one or more of the plurality of first switching elements.

16. A chipset, comprising:
a capacitive voltage divider that includes a plurality of capacitive elements connected in series with each other, and a plurality of first switching elements associated with the plurality of capacitive elements;
an inductive converter that includes at least one inductive element and a plurality of second switching elements associated with the at least one inductive element, and wherein one or more switching elements of the plurality of second switching elements are connected to each other and to an output of the capacitive voltage divider; and
a controller configured to:
control execution of a plurality of voltage conversion cycles to provide a charging pulse to a battery, wherein, each voltage conversion cycle includes operations to:
obtain, by the capacitive voltage divider, from a power supply, an input voltage;
generate, by the capacitive voltage divider, based on the input voltage, a plurality of intermediate voltages;
provide one or more of the plurality of intermediate voltage to the inductive converter; and
generate, by the inductive converter, based on the one or more of the plurality of intermediate voltages, one or more portions of the charging pulse; and
provide a plurality of portions of the charging pulse, generated during the plurality of voltage conversion cycles, to the battery,
wherein the controller is further configured to control the inductive converter and the plurality of second switching elements to change a direction of current to the battery without changing a direction of current in the inductive element, whereby the inductive converter is capable of providing current to the battery and obtaining current from the battery, and wherein by keeping the direction of current in the inductive element unchanged, the controller is configured to change the direction of current to the battery instantaneously.

17. The chipset of claim 16, wherein the controller is configured to control the inductive converter to provide positive charging pulses and negative charging pulses to the battery.

* * * * *